(12) United States Patent
Kalverkamp et al.

(10) Patent No.: US 9,643,372 B2
(45) Date of Patent: May 9, 2017

(54) APPARATUS FOR COMPACTING FIBROUS PLANT MATERIAL, ESPECIALLY FOR COMPACTING STALK MATERIAL

(71) Applicants: Klemens Kalverkamp, Damme (DE); Felix Kalverkamp, Damme (DE)

(72) Inventors: Klemens Kalverkamp, Damme (DE); Felix Kalverkamp, Damme (DE)

(*) Notice: Subject to any disclaimer, the term of this patent is extended or adjusted under 35 U.S.C. 154(b) by 11 days.

(21) Appl. No.: 14/423,675

(22) PCT Filed: Sep. 3, 2013

(86) PCT No.: PCT/EP2013/002639
§ 371 (c)(1),
(2) Date: Feb. 24, 2015

(87) PCT Pub. No.: WO2014/037100
PCT Pub. Date: Mar. 13, 2014

(65) Prior Publication Data
US 2015/0217528 A1    Aug. 6, 2015

(30) Foreign Application Priority Data

Sep. 5, 2012   (DE) .................. 10 2012 017 549

(51) Int. Cl.
*B30B 11/28*    (2006.01)
*B30B 3/00*    (2006.01)
(Continued)

(52) U.S. Cl.
CPC .............. *B30B 3/005* (2013.01); *B30B 11/28* (2013.01); *B30B 15/308* (2013.01); *B29B 9/10* (2013.01)

(58) Field of Classification Search
CPC ....... B30B 3/005; B30B 11/165; B30B 11/18; B30B 11/28; B30B 15/308; B29B 9/10
(Continued)

(56) References Cited

U.S. PATENT DOCUMENTS 1,127,925 A    2/1915    Schueler
2,052,449 A    8/1936    Connell
(Continued)

FOREIGN PATENT DOCUMENTS

DE        1101374 B    3/1961
DE        1215997 A    5/1966
(Continued)

OTHER PUBLICATIONS

Deutsches Patent—Und Markenamt, Search in priority application, Jun. 6, 2013.
(Continued)

*Primary Examiner* — James Mackey
(74) *Attorney, Agent, or Firm* — Laurence P. Colton; Smith Tempel Blaha LLC

(57) ABSTRACT

An apparatus for pelletizing renewable raw materials, such as stalk material, having a feeding device for feeding the materials to be pelletized and having at least one press drum pair that is settable into opposite rotational movements, wherein the feeding device has a drivable conveyor belt which conveys the material to be compressed into the region of a feed hopper between the press drum pair, and which wraps around one of the two press drums regionally over an angle of at least 20° in order to form a precompaction region, and wherein the precompaction region has a constant width with respect to its length, said width corresponding more or less to the width of the press drums.

23 Claims, 16 Drawing Sheets

(51) Int. Cl.
*B30B 15/30* (2006.01)
*B29B 9/10* (2006.01)

(58) Field of Classification Search
USPC .................................................. 425/237, 362
See application file for complete search history.

(56) References Cited

U.S. PATENT DOCUMENTS

| | | | |
|---|---|---|---|
| 2,365,658 A | 12/1944 | Schumacher | |
| 3,015,199 A * | 1/1962 | McKeon et al. | B30B 11/20 100/157 |
| 3,249,069 A | 5/1966 | Forth | |
| 3,324,808 A * | 6/1967 | Forth | B30B 11/28 100/173 |
| 3,365,749 A | 1/1968 | Pinkham | |
| 3,430,583 A * | 3/1969 | Pool et al. | B30B 11/16 100/152 |
| 3,452,393 A | 7/1969 | Pierson | |
| 3,613,335 A * | 10/1971 | Forth | A01F 15/00 425/382 R |
| 3,782,273 A | 1/1974 | Romer | |
| 4,798,529 A * | 1/1989 | Klinner | B30B 11/027 100/155 R |
| 5,241,901 A | 9/1993 | Kunig | |
| 2010/0040721 A1 | 2/2010 | Dec | |

FOREIGN PATENT DOCUMENTS

| | | |
|---|---|---|
| DE | 4116476 A1 | 11/1992 |
| DE | 9304636 U1 | 8/1994 |
| DE | 29606641 U1 | 8/1997 |
| DE | 202009001697 U1 | 5/2009 |
| FR | 2274438 A1 | 1/1976 |
| FR | 2931721 A1 | 12/2009 |
| GB | 356388 A | 9/1931 |
| GB | 416539 A | 9/1934 |

OTHER PUBLICATIONS

WIPO, International Search Report in priority application, Dec. 2, 2013.
State Intellectual Property Office of the People's Republic of China, Notification of the First Office Action (on related application), Mar. 3, 2016.

* cited by examiner

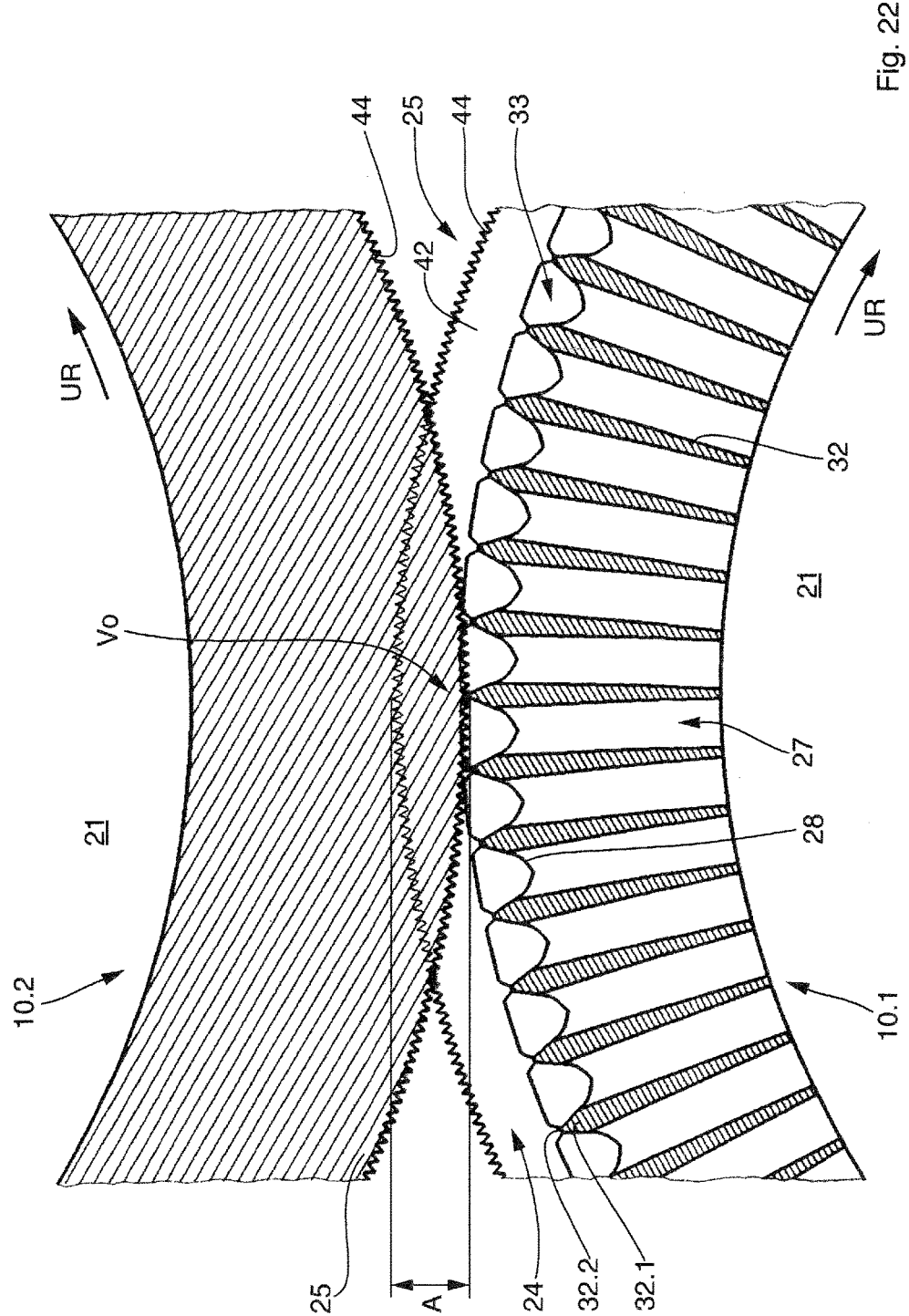

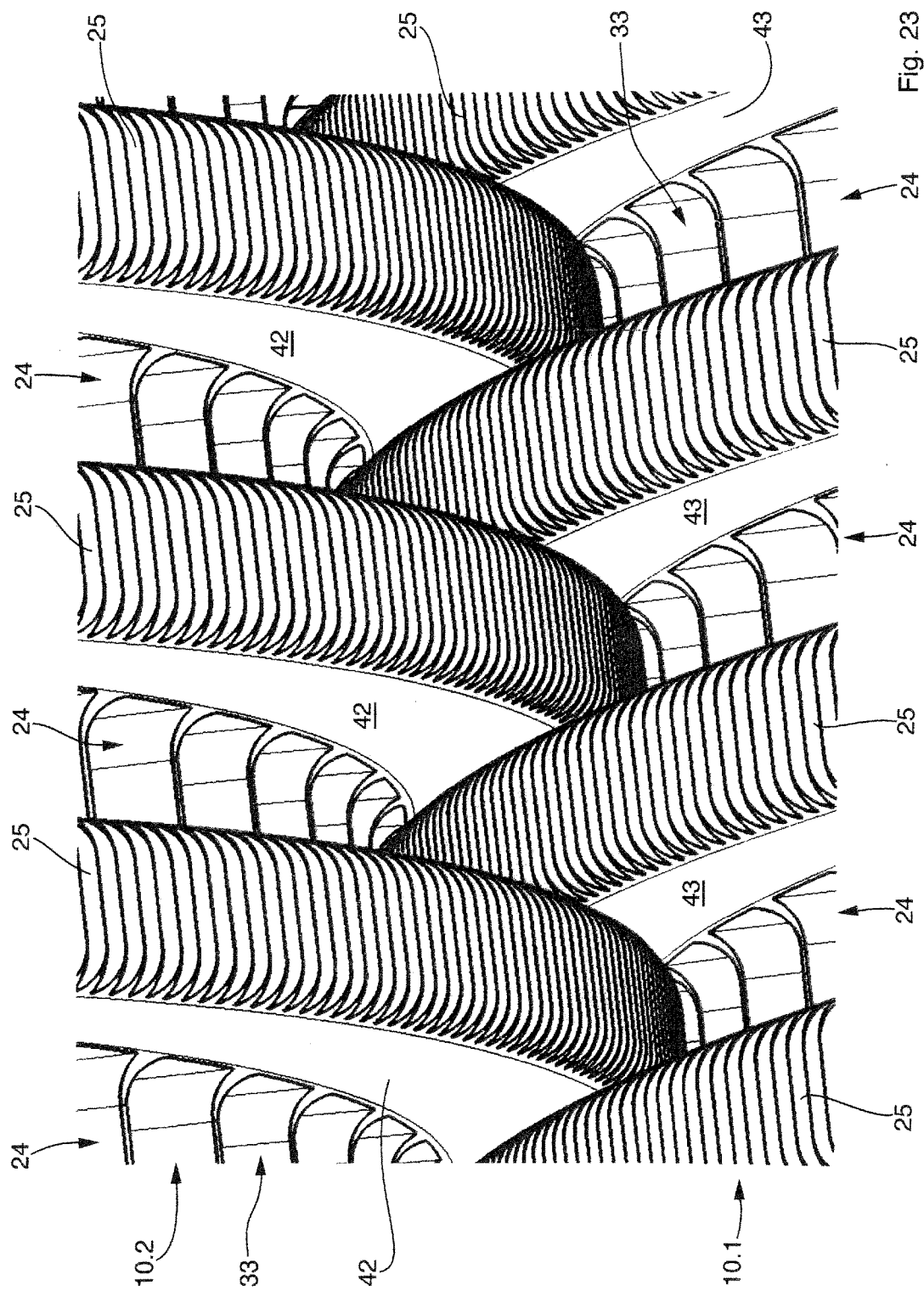

APPARATUS FOR COMPACTING FIBROUS PLANT MATERIAL, ESPECIALLY FOR COMPACTING STALK MATERIAL

STATEMENT OF RELATED APPLICATIONS

This patent application is the U.S. National Phase of International Application No. PCT/EP2013/002639 having an International Filing Date of 3 Sep. 2013, which claims priority on German Patent Application No. 10 2012 017 549.3 having a filing date of 5 Sep. 2012.

BACKGROUND OF THE INVENTION

Technical Field

The invention relates to an apparatus for compacting fibrous plant material, in particular for compacting stalk material, having a feeding device for feeding the plant material or stalk material to be compacted and having at least one pair of press drums that are settable into opposite rotational movements.

Prior Art

The utilization of renewable raw materials, such as fibrous plant material, is increasingly gaining in importance. Thus, renewable raw materials, such as wood, but also harvested stalk material, for example straw, can be utilized further, for example for the purposes of bedding or combustion. In this case, it has proven very advantageous to pelletize such raw materials and to compact them to form pellets.

U.S. Pat. No. 3,613,335 discloses an apparatus, to be towed by a towing vehicle, for pelletizing materials, having two press drums that are drivable in opposite directions. In order to gather the material to be pelletized from the ground, provision is made of a pick-up apparatus which conveys the material to be pelletized in the direction of a feeding device. The feeding conveying device consists of a conically configured drum that is drivable about an axis that is inclined with respect to the press drums, and also of a further drum which is arranged coaxially with a first press drum and is firmly connected thereto. This further drum runs in an internal recess of the conical drum that is arranged in an inclined manner. The material to be pelletized is thus moved via the coaxially arranged drum and an end-side face of the conical drum transversely to the direction of travel of the apparatus in the direction of a filling region between the press drums, and in the process is compacted to a small extent. A disadvantage with this apparatus is that, on account of lacking or insufficient counter-pressure, no effective compaction can take place. On account of the lateral feed of the material to be pressed, only very narrow press drums can be used for producing pellets. Thus, only a small throughput is achievable.

DE 20 2009 001 697 U1 discloses an apparatus for pressing pellets, which has a pair of press drums arranged downstream of a feeding device, said press drums rotating in opposite directions. One press drum has press channels that are open toward an internal cavity and which each have a receiving groove space in their upper region facing the circumference of the press drum. The press drum having press channels is assigned the other press drum which has compression rings with cylindrical press punches. During rotation of the press drums, each particular press punch passes into the associated press channel, on passing through or passing the connecting plane in which the rotation axes of the press drums are located, in order to plug the material to be pelletized into the press channel and form it into pellets. In this apparatus, free-flowing material to be pressed is fed to the press drums by a feed conveyor in the form of a screw. Such a feeding device is not advantageous for stalk and plant material.

BRIEF SUMMARY OF THE INVENTION

It is the object of the present invention to create an apparatus for compacting fibrous plant material, in particular stalk material, which allows economically optimized production of pellets and can realize precompaction that is as great as possible.

The object is achieved by an apparatus for compacting fibrous plant material, in particular for compacting stalk material, having a feeding device for feeding the plant material or stalk material to be compacted and having at least one pair of press drums that are settable into opposite rotational movements, characterized in that the feeding device comprises a drivable conveyor belt which conveys the material to be pressed, in particular plant material or stalk material to be compacted, into the region of a feed hopper between the press drums, and which wraps around one of the two press drums regionally over an angle of at least 20° in order to form a precompaction region, wherein the precompaction region has a constant width along its length. An apparatus is thus created, wherein the feeding device comprises a drivable conveyor belt which conveys the stalk material to be compressed into the region of a feed hopper between the press drums and which wraps around one of the two press drums regionally over an angular range of at least 20° in order to form a precompaction region, which can be configured in a channel-like manner. The precompaction region has a constant width in the conveying direction along its longitudinal extent.

Preferably, the compaction region has a width which corresponds more or less to the width of the press drums and/or at least the working width of the press drums.

The spacing of the conveyor belt from the press drum can decrease, in particular continuously decrease, in the conveying direction. The mentioned configuration of the feeding device allows particularly uniform precompaction of the plant material or stalk material to be compressed. When the precompaction region narrows preferably continuously, the conveyor belt approaches, in the conveying direction, the circumference of at least that press drum which is wrapped around to a certain minimum degree by the conveyor belt for effective compaction. The constant width of the precompaction region, said width corresponding more or less to the width of the press drums or at the very least the working width thereof, also makes it possible to process large quantities of plant material or stalk material within a very short period of time, and so there is more economical compaction of the plant material or stalk material compared with the prior art.

By way of the feeding device, it is possible to process even long-fiber stalk material without excessive or even any prior precomminution having to take place. Thus, the stalk material can be picked up directly from the field and processed.

It has proven advantageous for the conveyor belt to wrap around the at least one press drum preferably over an angular range of 30° to 120°. Within this wrapping range, sufficient and optimally uniform precompaction which does not take place too quickly is ensured.

The conveyor belt can be embodied as an endlessly embodied web belt or textile belt which is guided on a number of rollers, which can be arranged on both sides of the conveyor belt and at least one of which is drivable. Alternatively, the conveyor belt can also be driven via the press drums, optionally by means of a transmission.

In a preferred embodiment, at least one of the rollers, but advantageously a number or all of the rollers, is adjustable simultaneously with respect to the position of the press drums. In this way, the feeding device can be displaced or even pivoted relative to the press drums, such that the configuration of the precompaction region can be influenced. In a manner corresponding to the stalk material or plant material to be processed, on the one hand the length of the precompaction region can thus be changed within certain limits, or on the other hand the spacing from the conveyor belt to the press drums can be changed. As a result, the degree of precompaction can be influenced.

Advantageously arranged upstream of the feeding device is a feed screw, which brings together the picked-up material in the transverse direction over a width which is greater than the width of the press drums. This ensures that enough material for economical production of the material to be pelletized is always available to the feeding device. It is also possible in this way for large quantities of material to be processed within a very short time.

As seen in the feeding direction of the plant material or stalk material to the press drums, the feeding device projects with respect to the front side of the furthest forward press drum in the direction of the pick-up apparatus. The upper strand of the conveyor belt of the feeding device as a result begins in front of the furthest forward point of the front press drum. In this way, excess plant material or stalk material, which remains on the press drums after passing through the pressing region, can be transported back to the upper strand of the feeding device from the outer circumference of the front press drum and be fed back to the pressing region between the press drums again.

A further advantageous embodiment has a selector or stone crusher arranged in front of the feed screw, such that stones or other foreign bodies conjointly picked up are either separated out or sufficiently comminuted.

Advantageously, it is additionally possible to provide a suction fan and/or moistening apparatus. By way of the suction fan, disruptive dust or incompletely compressed fine portions are purgeable. By way of the moistening apparatus, either the material can be advantageously pretreated or optionally also the pressing dust can be bonded.

It is also particularly preferred for the apparatus to be developed as characterized in that each of the press drums has receiving grooves and compression rings that are arranged alternately alongside one another on its circumference along its axial longitudinal extent, in that the compression rings of the in each case one press drum engage in the receiving grooves of the other press drum during the opposite rotational movement of the press drums, and in that a circumferential profile having radially external protrusions is provided on the compression rings, in particular an outer contour of the protrusions, as viewed in the direction of the rotation axes of the press drums, is adapted to the contour of the receiving grooves, preferably the contours of the mutually opposite press drums form a profiled, preferably undulating, contour line in the plane of the rotation axes, and/or the contours of the mutually opposite press drums form a common contour line in the plane of the rotation axes. A device for pelletizing materials is thus created, wherein no room in which material to be processed can stick and as a result no longer passes into the press channel is available any longer for the plant material or stalk material to be pelletized during the rotation of the press drums and the engagement of the compression ring in the respective receiving grooves.

Since, in the region, during the rotation of the press drums, in which the respective region of the compression ring is intended to ensure the maximum compaction of the material for the purpose of transferring the material into the press channel, i.e. in the region in which the compression ring and the receiving groove of the two press drums pass through or pass the connecting plane between the rotation axes of the press drums, that is to say the connecting plane in which the two rotation axes of the two press drums are located, respective compression rings ensure, in interaction with the wall web oriented transversely in to the direction of rotation, that—as viewed in the direction of rotation—the high-compaction region formed from the receiving grooves and the compression ring is entirely or approximately closed toward the front in the direction of rotation by the wall web and by the compression ring. This region is then substantially only still open toward the press channel, since it is also bounded laterally by compression rings such that all the materials located in this space, for example including long-fiber stalk material, can be compacted and reliably transferred into the press channel. Approximately closed means in this connection that, on account of manufacturing tolerances of and unavoidable wear phenomena on such an apparatus, complete closing cannot quite be achieved.

Provision is preferably made for the two press drums to be set into synchronous opposite rotational movements. As a result, both press drums can be driven in rotation in opposite directions at the same rotational speed. Such a drive is easily realizable.

The apparatus is preferably designed such that the two press drums are configured in an identical manner. In particular, the two press drums are configured in an identical manner and preferably also dimensioned in an identical manner, in that they have identical dimensions and an equal number of successive compression rings and receiving grooves.

The wall web that is at the rear in the direction of rotation and is arranged transversely to the direction of rotation, said wall web delimiting the receiving groove space and the press channel to be taken into consideration toward the rear (with respect to the direction of rotation of the press drums), is at only a small distance from the associated wall of the high-compaction region. On account of the 360° circumferential surface of the press drums, at this distance the high-compaction region is already approximately closed. This rear wall web that is arranged transversely to the direction of rotation is then the next wall web—with respect to the nearest employed pitch of the press channels—which bounds the high-compaction region, together with the compression ring of the other press drum, toward the front in the direction of rotation, this being established continuously during the 360° rotation by the respective press channels of the receiving groove spaces. This allows optimal compaction of the material to be pressed without there being the risk of clogging. Likewise, reactive power levels are reduced to a minimum.

The walls of the high-compaction region can be designed such that they each comprise a profile formed by spaced-apart protrusions, and for example an intermediate region, or a depression, which is formed in a rectilinear manner in cross section or in a curved manner in cross section between two protrusions, preferably teeth, is present, said depression having in each case curvature components or gradients on the protrusions with projecting points or teeth having tooth tips, which create in each case a compaction direction, or compaction direction component, toward a central conveying region associated with the press channel.

However, it is likewise possible to form this space overall in a curved manner with a central tooth which is configured in the manner of a spike, wherein the wall webs, oriented transversely to the direction of rotation, of the press channels each dip into the space, oriented in a curved manner, of the compression ring such that, on passing the mentioned connecting plane, the front wall web, in the direction of rotation, of the press channel to be taken into consideration moves toward the wall of the curved space of the compression ring and thus at least approximately closes the high-compaction region in the direction of rotation, such that again optimal precompaction takes place with the pressing direction toward the press channel, without any contact surfaces for material to be processed having arisen, material being able to stick to said contact surfaces without passing into the press channel.

An advantage of this novel apparatus is that virtually all plant material or stalk material is pushed into the press channels from the pressing region, that is to say that region in which the compression rings engage in or dip into the receiving grooves. As long as protrusions or tooth tips present on the compression rings are located opposite the receiving openings in the press channels, stalk material that is not pushed into the receiving channel can escape into the gaps between adjacent protrusions or into tooth gaps in order to be compressed therein, and thus any reactive power of the pelletizing apparatus is reduced, since in this case there is a connection between the press channels and the gaps or tooth gaps, said connection ensuring a pressure reduction.

In a preferred embodiment, the highest points, or vertices of the protrusions or tooth tips of the teeth, are located opposite the webs between the press channels, with the result that it is not possible for material to reach locations above the webs, which material would be conveyed out of the pressing region on further rotation of the press drums and can no longer pass into the press channels. Thus, the reactive power of the pressing apparatus for pressing pellets is considerably reduced and so the losses, that is to say the plant material or stalk material which is fed to the pressing region and does not pass into the press channels, are considerably reduced.

In a preferred embodiment, the protrusions or tooth tips have an outwardly directed arcuate contour and the groove bottom of the receiving grooves has a corresponding contour adapted thereto. This embodiment of the pressing space, which is located over the press channels in the receiving groove and is formed in interaction with the protrusions or teeth, ensures optimized and more uniform compression of the plant material or stalk material in the press channels.

Within a gap or tooth gap between two protrusions or tooth tips, provision can advantageously be made in each case of a spike that points radially outward. The spike serves to crush and comminute any stones or similar foreign bodies that may have passed into the inlet region of the press channel, so that no clogging of the press channels can occur.

All the compression rings are bounded by two opposite annular walls. The annular walls of the compression rings are located in parallel planes which intersect the rotation axes of the press rolls in a perpendicular manner or at right angles. The planes of the annular walls of all the compression rings of the two press drums extend parallel to one another, wherein all the planes and the annular walls located thereon are at identical spacings. As a result, the spacings between opposite annular walls of each compression ring and the spacings between the annular walls of adjacent compression rings are identical and both all the compression rings and receiving grooves are approximately the same width. In this way, all the compression rings can engage in the receiving grooves assigned thereto, wherein the annular walls overlap one another and are located close together in the pressing region of the press drums.

The lateral annular walls of the compression rings have circumferential cutting edges at their transitions, or edges, to the outer circumference or to the circumferential wall of the compression rings. As a result of the width of the compression rings being adapted to the widths of the receiving grooves, the outer, circumferential cutting edges of the compression rings result in the plant material or stalk material being cut when the compression rings enter the receiving grooves in the pressing region and in the process regional overlapping of the annular walls occurs. This cutting operation considerably increases the effectiveness and operational reliability of the apparatus.

As a result of the compression rings entering the receiving grooves and the sectional overlapping of the annular walls in the pressing region, a relative movement of the outer circumferential surface, profiled by protrusions and intermediate depressions, of the compression rings with respect to the groove bottoms of the receiving grooves occurs, in particular when both press rolls are driven synchronously at identical rotational speeds, because, in spite of the press drums being configured in an identical manner, the diameter of the circumferential surface of the compression rings is greater than the diameter of the groove bottoms of the receiving grooves. The result is slip between the compression rings and the receiving grooves in the pressing region, this resulting in effective conveying, in particular cramming, of the plant material and stalk material into the press channels, or the funnel-like introduction regions provided upstream of the latter.

Provision is further made to profile the outer circumference of the compression rings by way of alternately successive protrusions and depressions. The protrusions and the depressions located between two protrusions can have any desired shapes. Preferably, the protrusions are configured as teeth and the tooth gaps between two spaced-apart teeth as depressions. The depressions between the tooth gaps can be configured in an arcuate or straight manner or in a manner stepped in an angular manner. The depressions receive in each case a small quantity of plant material or stalk material to be compacted and move it to upstream of the respective press channel, wherein the teeth that bound each depression on both sides ensure that the plant material or stalk material is pushed into and through the press channels at high pressure by the press drums.

The invention comprises a pelletizing machine having the apparatus according to the invention for pelletizing material, wherein the pelletizing machine can either be configured to be towable by a towing vehicle, to be a self-propelled apparatus or else to be stationary.

BRIEF DESCRIPTION OF THE DRAWINGS

In the figures of the illustrated exemplary embodiments:
FIG. 22 shows an illustration analogous to FIGS. 18 to 21 of an alternative exemplary embodiment in which the outer circumference of a compression ring is provided with a closely spaced (zigzag-shaped) tooth profile, wherein the otherwise concealed region, profiled with closely spaced teeth, of the compression ring, arranged adjacently to the receiving groove, of the one roll is illustrated in a lighter illustration,
and FIG. 23 shows a perspective illustration of a detail of the exemplary embodiment according to FIG. 22, with the compression rings of the one press drum, which dip into the outer groove in the other press drum, being illustrated.

DETAILED DESCRIPTION OF PREFERRED EMBODIMENTS

Figure 1:
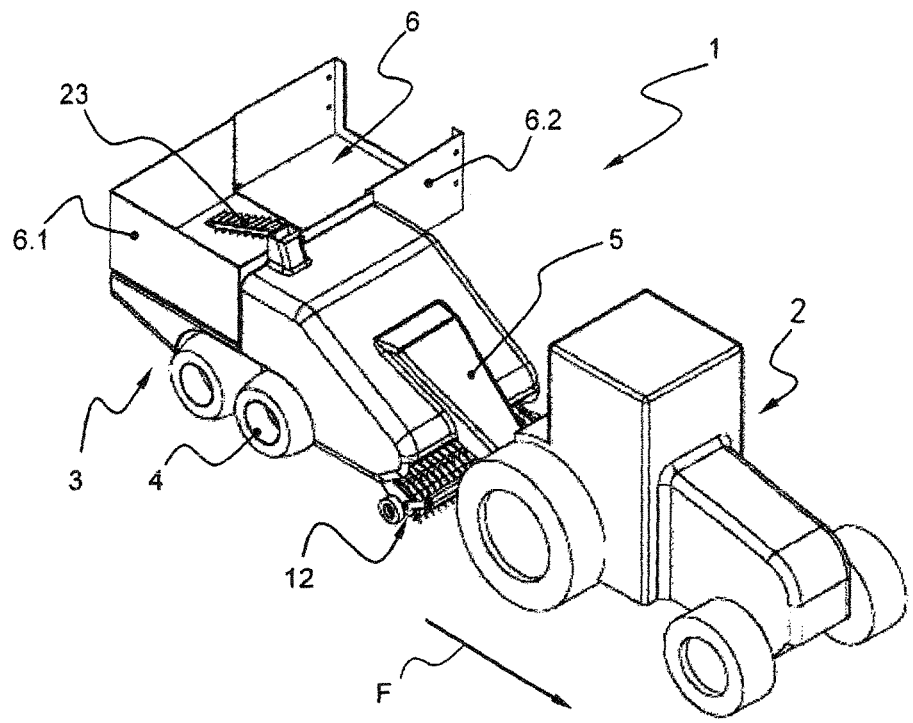
FIG. 1 shows a perspective view of a pelletizing machine with a towing vehicle.

FIG. 1 shows a pelletizing machine 1 which is towed by a towing vehicle 2. Alternatively, the pelletizing machine 1 could also be configured as a self-propelled or stationary apparatus. The pelletizing machine 1 has a chassis 3 with wheels 4, and a drawbar 5 for connecting to the towing vehicle 2. Furthermore, a bin 6 in which pelletized stalk material can be collected is provided on the pelletizing machine 1.

Figure 2:
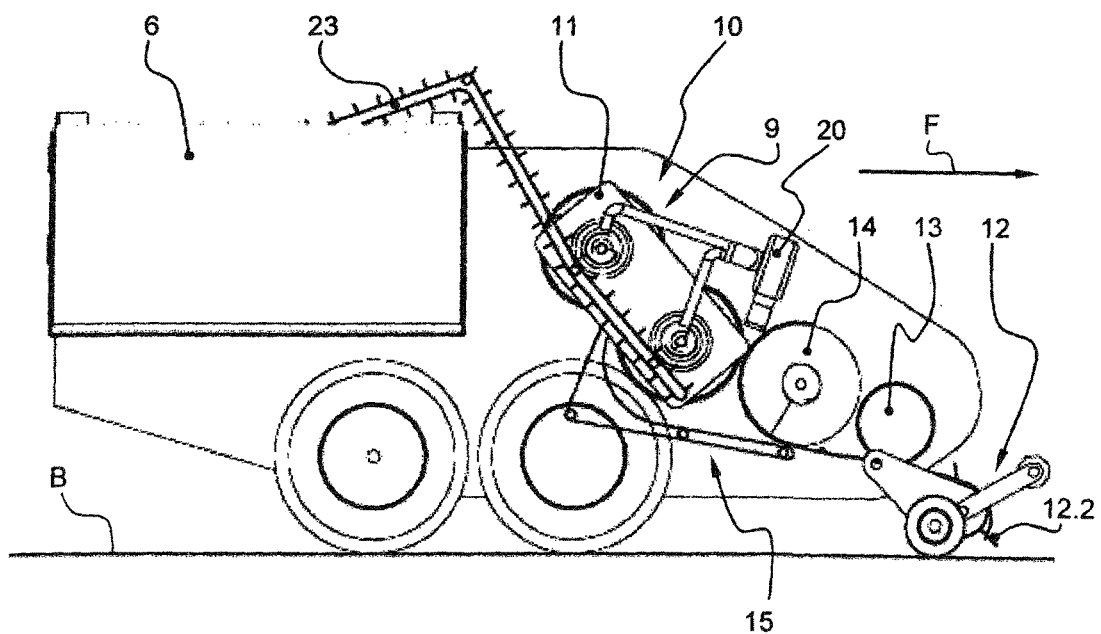
FIG. 2 shows a partially cutaway side view of the pelletizing machine from FIG. 1.
Figure 6:
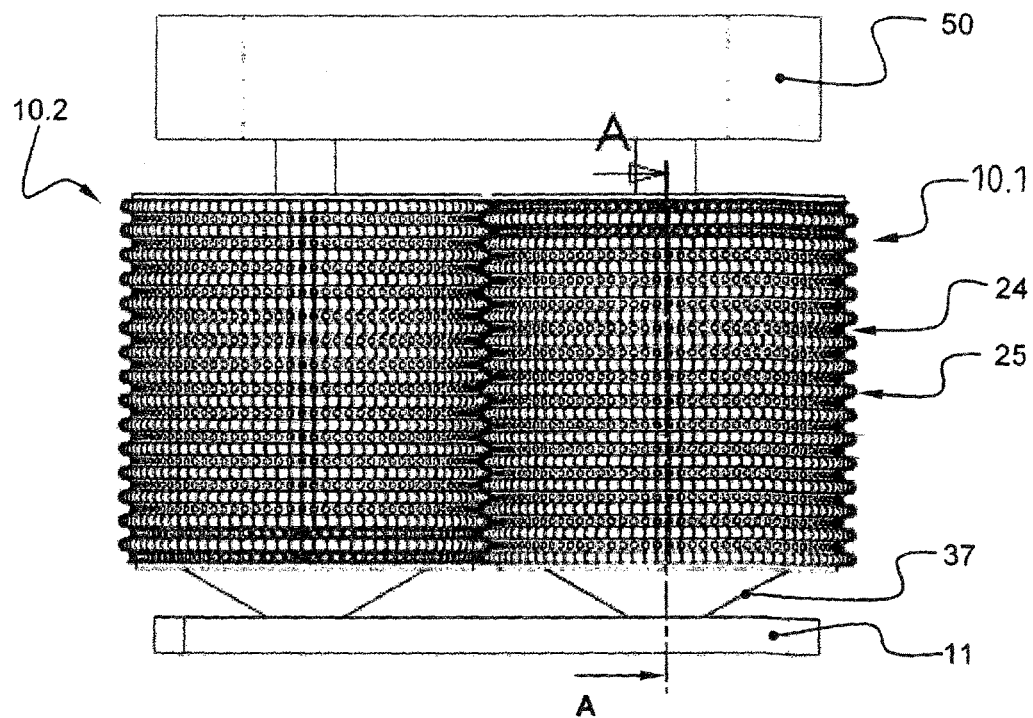
FIG. 6 shows a plan view of the press drums with a transmission arrangement and a bearing block.
Figure 7:
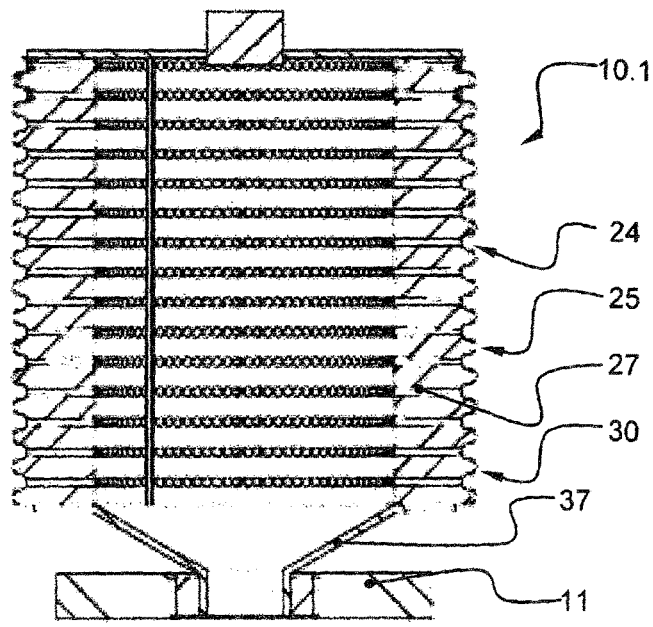
FIG. 7 shows a sectional view through a press drum along the rotation axis (section A-A from FIG. 6)
Figure 8:
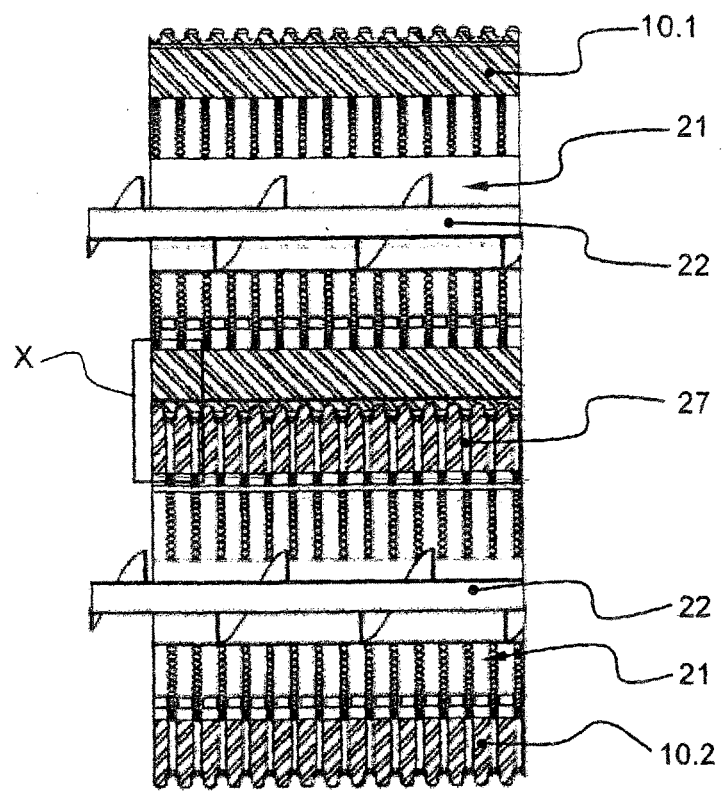
FIG. 8 shows a sectional view of the two press drums through the rotation axes, with the conveying screws being illustrated.
Figure 9:
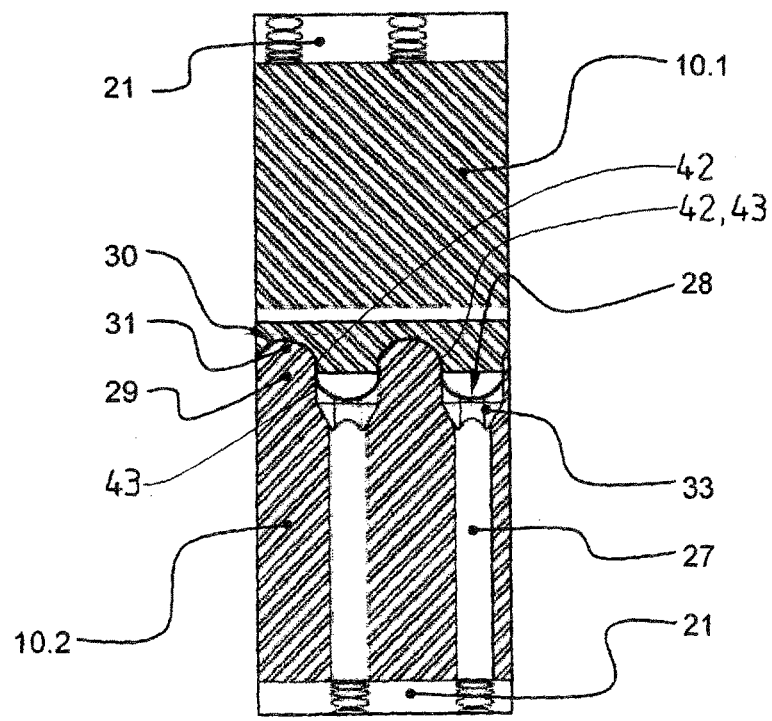
FIG. 9 shows a detail view of the pressing region in section corresponding to the detail X in FIG. 8.

The partially cutaway side view of the pelletizing machine 1 in FIG. 2 shows the basic arrangement of a first embodiment according to the invention having a press drum pair 9 for forming the pelletizing apparatus 10, wherein the press drum pair 9 is formed by two press drums 10.1, 10.2 that are drivable in opposite directions via a transmission 50 (cf. FIG. 6), said press drums 10.1, 10.2 being mounted in a rotatable manner on a bearing block 11 arranged on the chassis 3. Arranged upstream of the pelletizing apparatus 10 is a pick-up apparatus 12, referred to as a pick-up, a selector 13 arranged downstream of the pick-up apparatus 12 in the direction of travel F and a feed screw 14 arranged downstream of said selector 13 in the direction of travel F.

The pick-up apparatus 12 can be configured for example as a driven roll 12.1 having tines 12.2, arranged in a distributed manner on the circumference, for picking up the stalk material, for example straw. To this end, the tines 12.2 move in the vicinity of the ground B counter to the direction of travel F and convey the stalk material onto a grating 7, which is illustrated more clearly in FIG. 13. The stalk material that is subsequently conveyed continuously in this case pushes the stalk material ever further in the direction of the pelletizing machine 1. The rotation axis of the pick-up apparatus 12, of the selector 13 and of the feed screw 14 is oriented in each case parallel to the ground B and transversely to the direction of travel F.

The selector 13 separates foreign bodies such as wood or stones, which would lead to disruptions of the pelletizing apparatus 10, for example to jamming of the press drums 10.1, 10.2, from the stalk material. The width of the pick-up apparatus 12 and of the selector 13 is greater than the width of the press drums 10.1, 10.2, as is apparent from the subsequent figures. Therefore, between the selector 13 and the pelletizing apparatus, provision is made of a feed screw 14 which conveys the stalk material from the sides into the middle of the pelletizing machine 1. The feed screw 14 has tines 14.1 centrally on the continuous axle, said tines transporting the stalk material further in the conveying direction.

Arranged downstream of the feed screw 14 is a feeding device 15 having a revolving conveyor belt 16 on which the stalk material passes from the feed screw 14 and runs into a region of a feed hopper 17 between the press drums 10.1, 10.2. The conveyor belt 16 is drivable and guided on a number of rollers 18 such that the conveyor belt 16 wraps regionally around a first press drum 10.1. In this case, the spacing between the conveyor belt 16 and the press drum 10.1 decreases continually, preferably continuously, in the conveying direction R (FIG. 11) of the stalk material in order to form a channel-like precompaction region 19. In this case, on account of a width of the conveyor belt 16 which is at least as wide as the press drums 10.1, 10.2 or the working width of the press drums 10.1, 10.2, the precompaction region 19 has a constant width along its length of extent. The width of the precompaction region 19 thus corresponds more or less to the width of the press drums 10.1, 10.2 or at least to the working width thereof. The wrap angle of the conveyor belt 16 with respect to the press drum 10.1 is in this case at least 20°, but preferably the wrap angle is in an angular range between 30° and 180°. The front end, as seen in the conveying direction R, of the conveying belt 16 is guided to close to or under the feed screw 14 (FIGS. 2 and 3).

Figure 3:
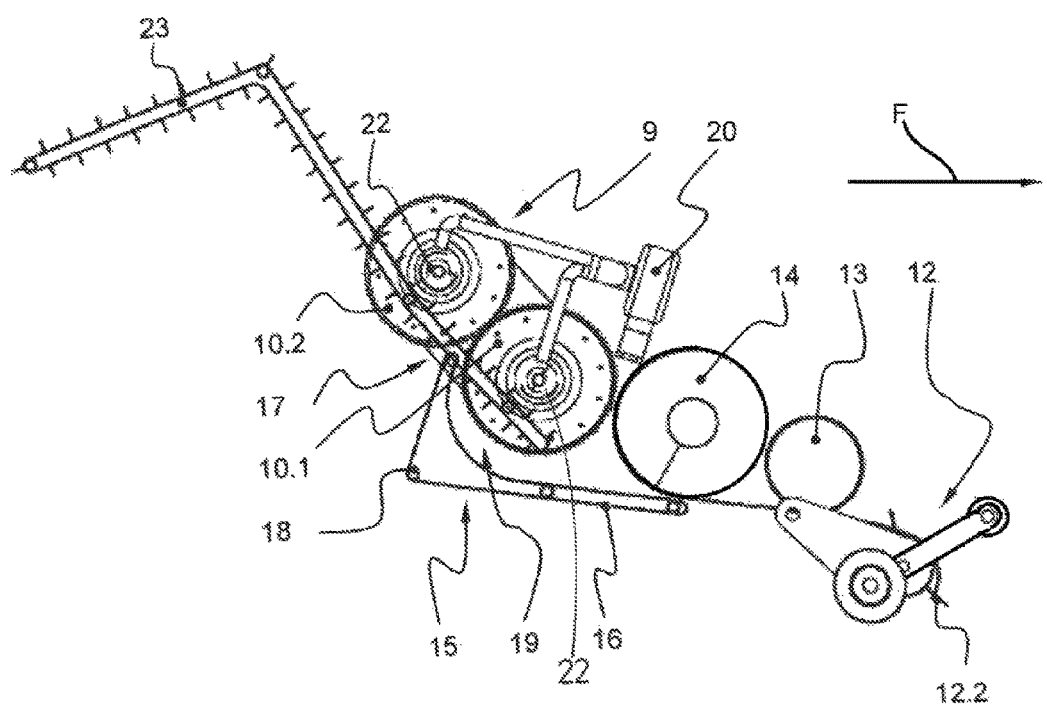
FIG. 3 shows a side view of a first embodiment of the individual elements of the pelletizing machine with the pelletizing apparatus according to the invention.
Figure 4:
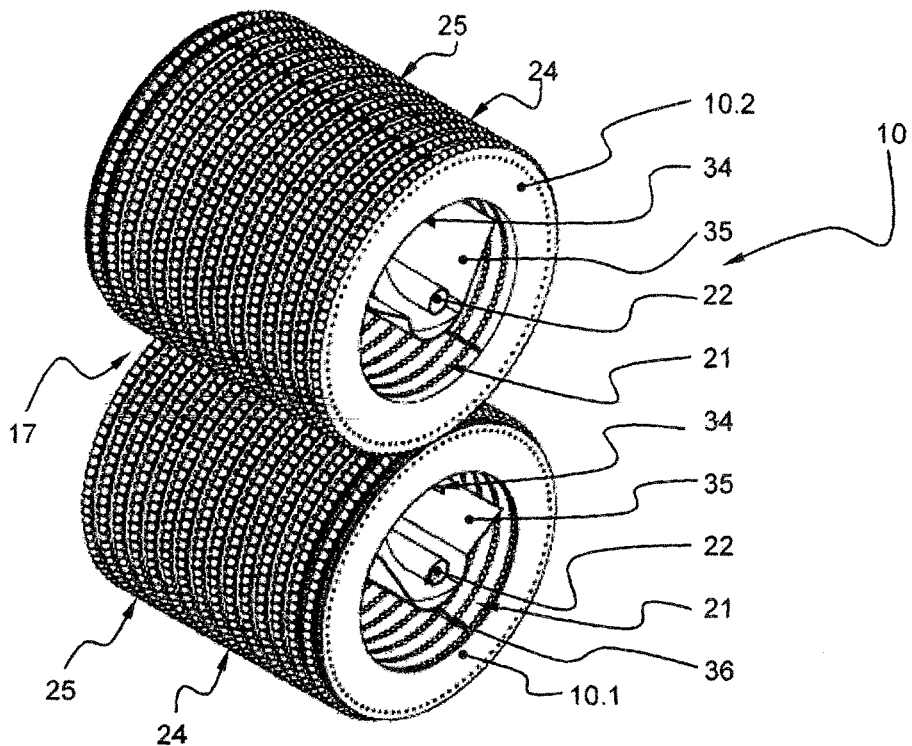
FIG. 4 shows a three-dimensional view of two press drums having conveying screws arranged in the cavity thereof.

In FIG. 3, it is furthermore discernible that the pelletizing machine 1 has a suction fan 20 with the aid of which pressing dust can be sucked out of the region of the press drums 10.1, 10.2.

Figure 11:
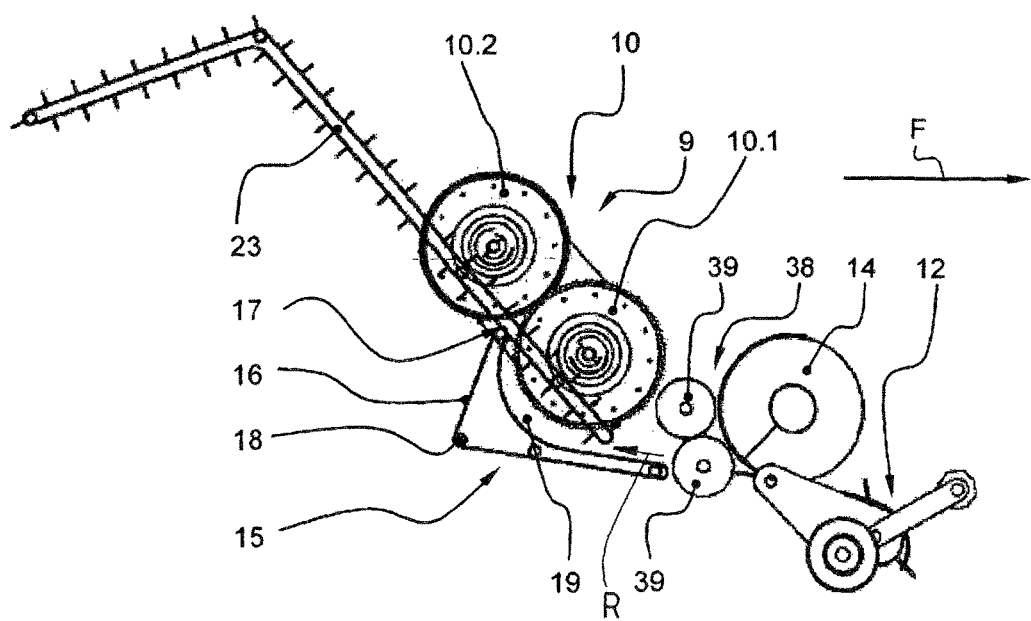
FIG. 11 shows a side view of a second embodiment of the individual elements of the pelletizing machine with the pelletizing apparatus according to the invention.

It is likewise discernible in FIG. 3 that a cavity 21, in which in each case a conveying screw 22 for transporting away the pelletized stalk material is arranged, is formed in each press drum 10.1, 10.2. Via this conveying screw 22, the pelletized stalk material passes onto a conveying belt 23 that runs laterally past the press drums 10.1, 10.2 (FIG. 11). With the aid of the conveying belt 23, pelletized stalk material is conveyed into the bin 6.

Figure 5:
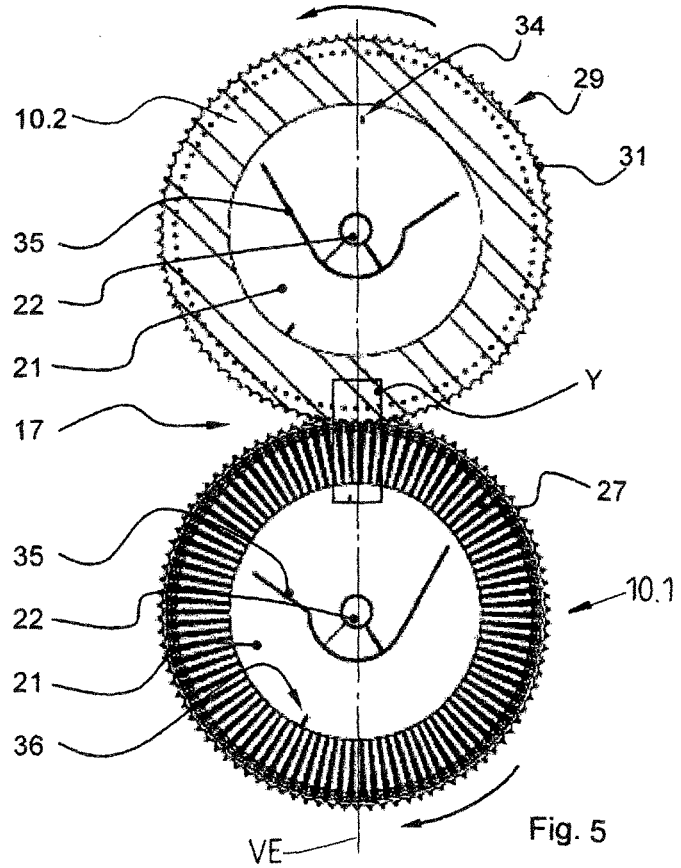
FIG. 5 shows a sectional view of the press drums perpendicularly to the rotation axes thereof.

The arrangement and configuration of the press drums 10.1, 10.2 is described in more detail in FIGS. 4 to 10 and 16 to 23. Both press drums 10.1, 10.2 are configured in an identical manner and preferably also dimensioned in an identical manner. Above all, the press drums 10.1, 10.2 have identical widths and identical diameters in the exemplary embodiment shown. It is discernible that the press drums 10.1, 10.2 are driven in opposite directions (arrows in FIG. 5) and each have an identical number of circumferential receiving grooves 24 and compression rings 25 in an alternate manner alongside one another in the axial direction. The compression rings 25 of the in each case one press drum 10.1, 10.2 engage in this case in the receiving grooves 24 of the in each case other press drum 10.2, 10.1.

In the case of press drums 10.1, 10.2 that are configured in an identical manner according to in the exemplary embodiment shown, said press drums 10.1, 10.2 are driven in opposite directions at the same rotational speed. Because the compression rings 25 engaging in the receiving grooves 24 have a larger diameter than the receiving grooves 24, the angular speed at the outer circumference of the compression rings 25 is greater than in the groove bottom 28 of the respective receiving groove 24. As a result, slip of the compression ring 25 engaging in in each case one open receiving groove 24 occurs at a higher circumferential speed.

At the point where the compression rings 25 engage in the receiving groove 24, an overlap A occurs. The greatest extent of the overlap A is located in an imaginary connecting plane VE (FIG. 5) between the rotation axes D of the two press drums. It is there that the high-compaction region, as it is known, in which the above-described slip occurs to a particular degree, is located.

It is discernible that each press drum 10.1, 10.2 has radially directed press channels 27 which are arranged within the receiving grooves 24 and extend radially from a groove bottom 28 of the receiving grooves 24 in the direction of the respective rotation axis D of the press drum 10.1, 10.2 and lead into the cavity 21. The cavity 21 is thus connected to the receiving grooves 24 via the press channels 27. The preferably identical diameter of all the in particular cylindrical press channels 27 can correspond to the width of the receiving grooves 24, but is preferably smaller.

All the compression rings 25 of the two press rolls 10.1, 10.2 are bounded on opposite sides by annular walls 42, 43. Each annular wall 42, 43 is located in a plane which intersects the rotation axes D of the press drums 10.1, 10.2 at right angles. The two opposite annular walls 42, 43 of each compression ring 25 extend parallel to one another. The spacings between opposite annular walls 42, 43 of each compression ring 25 and annular walls 42, 43, directed toward one another, of adjacent compression rings 25, which in each case bound a receiving groove 24 on both sides, are identical, with the result that the identical width of each compression ring 25 corresponds to the identical width of each receiving groove 24. In this way, the compression rings 25 engage in one another with a precise fit—apart from a technically necessary small clearance—in the region of overlap of the connecting plane VE, that is to say in the high-compaction region, and shortly upstream and shortly downstream thereof, and so, in the region of the connecting plane VE, the annular walls 42, 43 of adjacent compression rings 25 of different press rolls 10.1, 10.2 bear against one another or at least almost bear against one another. Cutting edges arise at the point where the annular walls 42, 43 on the outer circumference of the compression rings 25 end. As a result of said cutting edges, when the compression rings 25 dip into the receiving grooves 24 shortly before reaching the connecting plane VE, the stalk material is cut by the cutting edges.

In accordance with the illustrations, the compression rings 25 can have protrusions which are distributed in a radially external manner over the circumference and which are configured as teeth 29 in the exemplary embodiment shown. The teeth 29 can be provided with an arcuate contour 30 in the axial direction of the press drums 10.1, 10.2, but can also be straight. In a manner corresponding hereto, the groove bottom 28 can likewise have an arcuate contour. It is discernible in particular from FIG. 10 that during the pressing operation, that is to say when the two press drums 10.1, 10.2 come into engagement with one another, the tooth tips 31 of the teeth 29 are arranged opposite wall webs 32 formed between the press channels 27. It is likewise discernible from FIG. 10 that the press channels 27 each have a funnel-like introduction region 33 in the region of the groove bottom 28.

Stalk material is picked up as material from the ground B by means of the pick-up apparatus 12 and is fed via the grating 7 to the feed screw 14 which brings the stalk material together in the direction of the middle of the pelletizing machine 1. Via the feed screw 14, the stalk material thus passes onto the conveyor belt 16 of the feeding device 15, wherein the stalk material is continually precompacted in the precompacting channel 19 in the direction of the feed hopper 17. As a result of the movement of the press drums 10.1, 10.2, the stalk material is grasped by the teeth 29 in the region of the feed hopper 17 and is pushed or pressed into the press channels 27 by way of the continuing movement. In this case, the teeth 29, preferably together with the cutting edges on the outer circumference of the compression rings 25, carry out a process of severing or separating defined sections of stalk material, which are pushed into the press channels 27. As a result of the continually decreasing volume that is available for the stalk material, compaction or pressing of the stalk material occurs. The funnel-like introduction region 33 of the press channels 27 not only ensures further compaction and pressing of the stalk material but also ensures that the wall webs 32 between the press channels 27 are as narrow as possible. As a result, the tooth tips 31 are located directly opposite the wall webs 32 over an area that is as small as possible, such that pressing that is as effective as possible with reactive power, that is to say the amount of the rotary movement of the press drums 10.1, 10.2 that does not contribute to the pressing operation, that is as small as possible can take place.

When the stalk material enters the cavity 21 from the press channels 27, said stalk material is stripped or chopped via a fixed stripper 34, such that individual pellet-like compacted sections of stalk material are produced and drop into a collecting apparatus 35 that is upwardly open in a principally funnel-like manner or is in the form of a trough. Compacted stalk material that is located beneath the collecting apparatus 35 is grasped by a carrier 36 that rotates together with the press drums 10.1, 10.2 and is arranged on the inner side on the cavity 21 of the press drums 10.1, 10.2, and is conveyed upward into the collecting apparatus 35. Provided in the bottom of the collecting apparatus 35 is the conveying screw 22, which, by means of a helical configuration, conveys the compacted stalk material out of the cavity 21 and onto the conveying belt 23, which conveys or transports the finally pelletized stalk material into the bin 6. In the direction of the conveying belt 23, the cavity 21 is closed off by a funnel-like wall 37 which allows the pelletized stalk material to pass through centrally.

Figure 10:
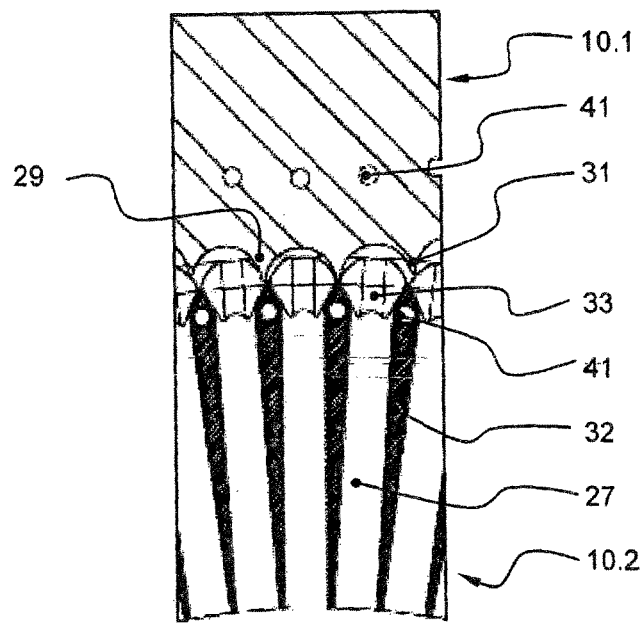
FIG. 10 shows a detail view of the pressing region in section corresponding to the detail Y in FIG. 5.

In accordance with the illustration in FIG. 10, heating and/or cooling ducts 41 that are arranged there within the press drums 10.1, 10.2 are discernible, said heating and/or cooling ducts 41 extending preferably within the wall webs 32. The heating and/or cooling ducts 41 control the temperature of the press drums 10.1, 10.2 in the region of the press channels 27 such that the pressing operation can take place in an optimal manner and so the stalk material does not for example stick to the walls of the press channels 27 and also optimal high compaction of the stalk material can take place by way of the pressing operation.

In FIG. 11, a second embodiment of a pelletizing machine 1 having the feeding apparatus 15 and pelletizing apparatus 10 according to the invention is discernible, wherein, instead of a selector 13, provision is made of a stone crusher 38, consisting of two drums 39 that rotate against one another. The front end, in the conveying direction R, of the conveyor belt 16 is guided up to the lower drum 39. The stone crusher 38 is arranged between the pick-up apparatus 12 and the feeding device 15 and crushes stones or the like which have been picked up by the pick-up apparatus 12.

Figure 12:
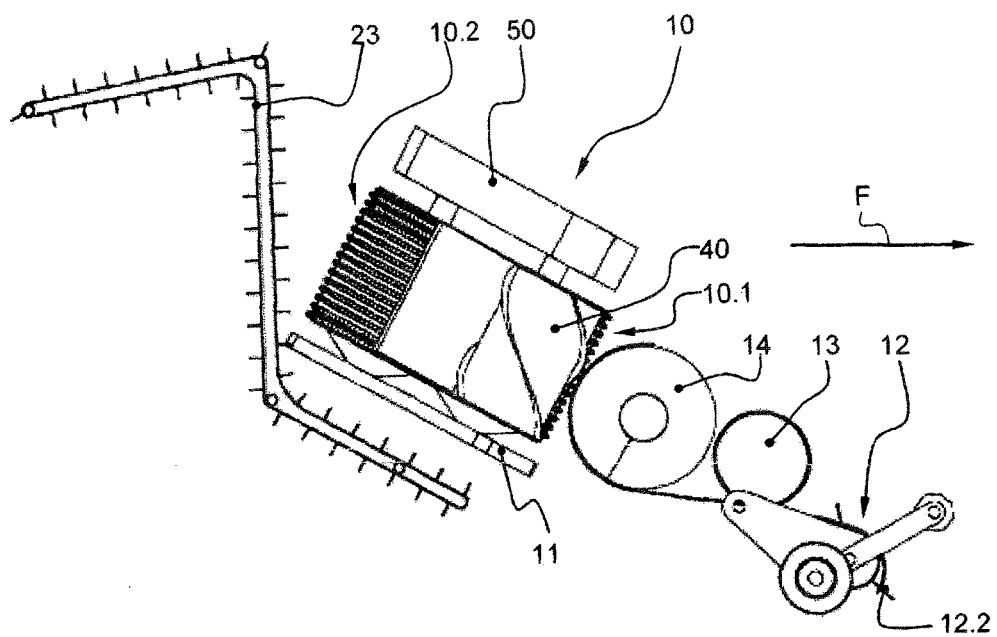
FIG. 12 shows a side view of a third embodiment according to the invention of the individual elements of the pelletizing machine with the pelletizing apparatus according to the invention.
Figure 13:
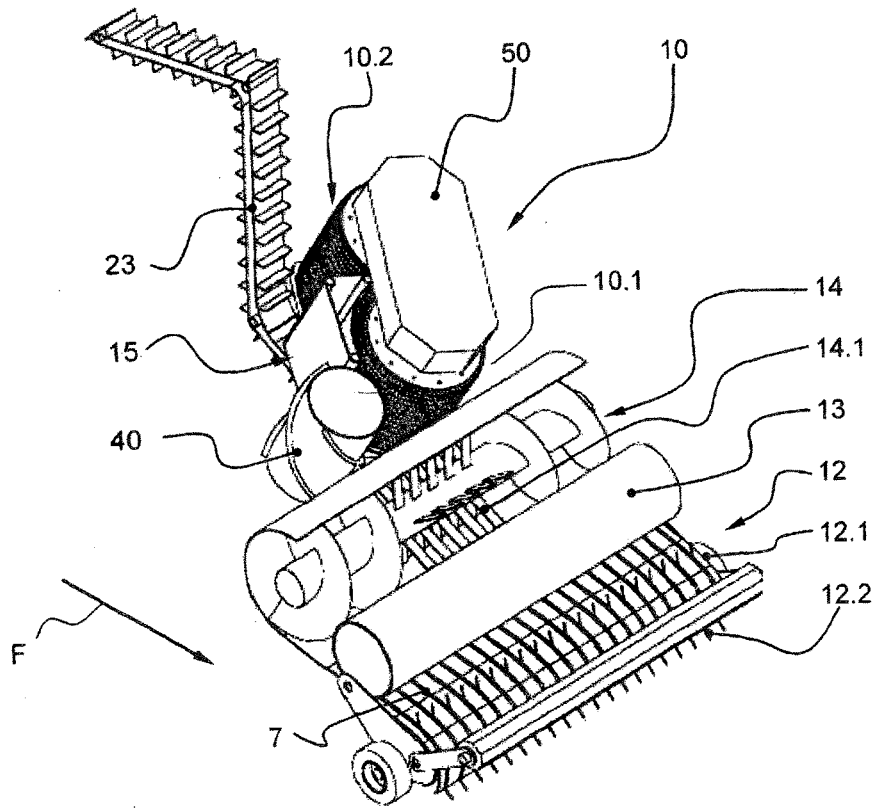
FIG. 13 shows a three-dimensional view of the pelletizing apparatus from FIG. 12.

FIGS. 12 and 13 show a further embodiment of the pelletizing machine 1 having the feeding device 15 and pelletizing apparatus 10 according to the invention, wherein here the pair of press drums 9 with the press drums 10.1, 10.2, and the feeding device 15 are arranged in a manner rotated substantially through 90° with respect to the first embodiment, such that the rotation axes D of the press drums 10.1, 10.2 and of the rollers 18 of the feeding device 15 are oriented in a manner inclined upwardly with respect to the vertical. As in the first embodiment, a pick-up apparatus 12, a selector 13 and a feed screw 14 are present here, too, wherein here, at the feed screw 14, the centrally provided tines 14.1 are clearly visible. Likewise clearly visible, in FIG. 13, is the grating 7, onto which the stalk material picked up by the pick-up apparatus 12 is conveyed.

As a special feature, this embodiment has an introduction drum 40 which is arranged downstream of the feed screw 14 and passes the stalk material on from the feed screw 14 to the feeding device 15. The orientation of the rotation axis of the introduction drum 40 corresponds to the orientation of the rotation axis D of the press drums 10.1, 10.2, in that the rotation axes D extend parallel to one another, wherein the introduction drum 40 has a screw-like or helical guiding structure for passing on the stalk material on its surface. Since the pelletized stalk material in this embodiment does not have to be conveyed laterally out of the press drums 10.1, 10.2, but, on account of the force of gravity, can drop out downwardly, the conveying belt 23 for transporting the pelletized stalk material into the bin 6 is arranged beneath the press drums 10.1, 10.2. Advantageously, in this embodiment, it is possible to dispense with a trough-like collecting apparatus 35 and with the conveying screw 22 arranged in the cavity 12.

Figure 14:
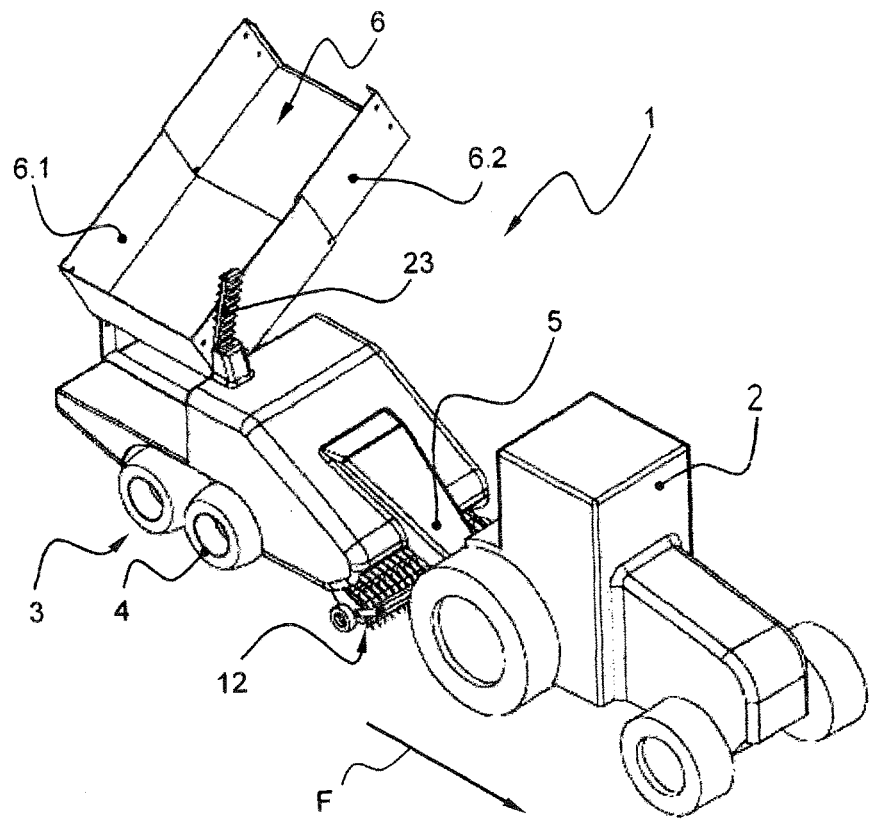
FIG. 14 shows the pelletizing machine, with a bin illustrated in an intermediate position.
Figure 15:
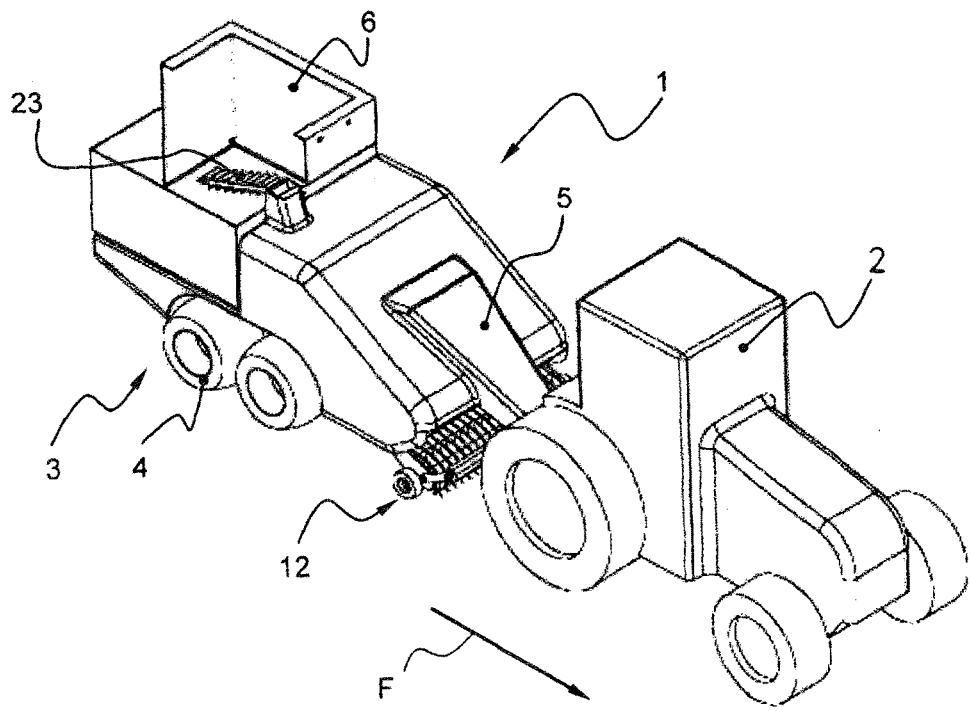
FIG. 15 shows the pelletizing machine, with the bin illustrated in a storage or transport position.

FIGS. 14 and 15 show the pelletizing machine 1 having the bin 6 in respective different positions of the bin 6. The bin 6 consists in this case of two elements 6.1 and 6.2, wherein one element 6.2 is embodied so as to be extendable with respect to the other element 6.1 in order to increase the bin capacity. In FIG. 14, the bin 6 is illustrated in a pivoted-up manner, wherein the conveying belt 22 has been raised for a collision-free pivoting-up movement. This position is an intermediate position toward a storage and transporting position of the bin 6, as is shown in FIG. 15. In this case, the width of the pelletizing machine 1 has been reduced such that the pelletizing machine 1 can be moved on a public road.

Figure 16:
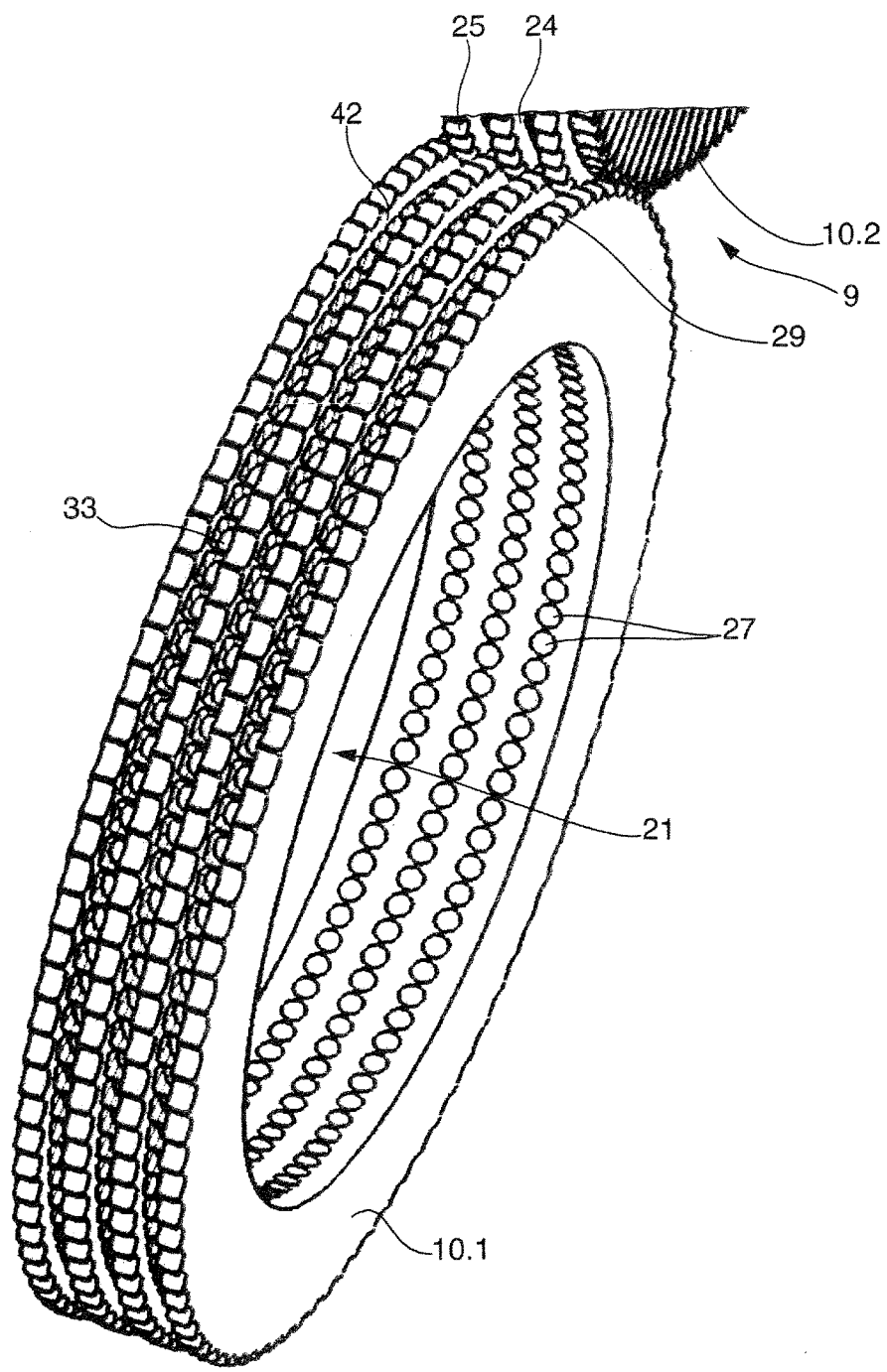
FIG. 16 shows an illustration analogous to FIG. 4 with an enlarged subregion of the receiving grooves and of the compression rings and of the internal cavity and of the press channels.
Figure 17:
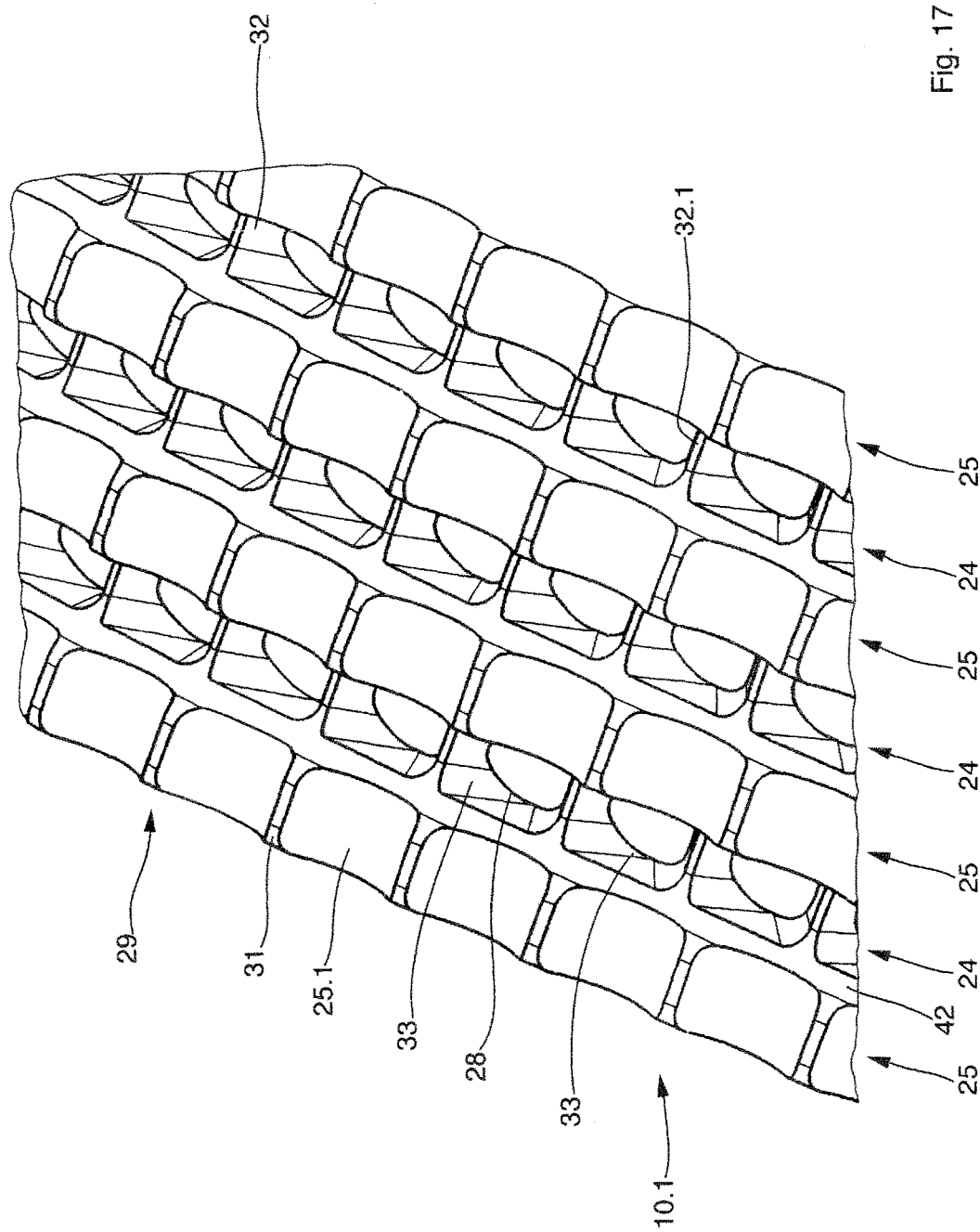
FIG. 17 shows a perspective illustration of a detail of part of the compression rings and of the receiving grooves in their alternating arrangement on the circumferential surface of a press drum.

In FIG. 16, a press drum 10.1 is illustrated once again in an enlarged manner, with the associated press drum 10.2 having the receiving grooves 24 and the compression rings 25, and the inner cavities 21 and the press channels 27 being indicated. For improved visualization, a detail of the region of the receiving grooves 24 and the compression rings 25 is illustrated once again in an enlarged manner in FIG. 17.

The exemplary embodiments in FIGS. 18 to 23 are in each case cross-sectional illustrations in the region of a receiving groove 24 and the associated compression ring 25.

Figure 18:
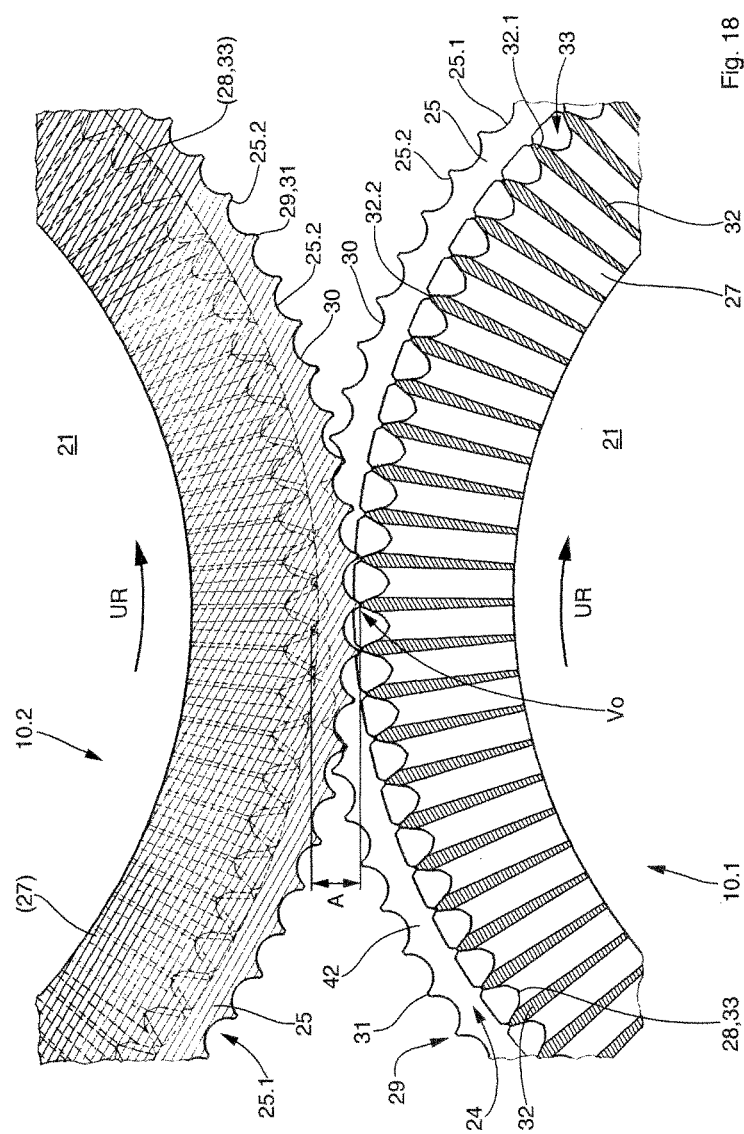
FIG. 18 shows a detail of an exemplary embodiment of a compression ring and of a receiving groove in a variant embodiment in which the wall region of the compression ring is formed in an inwardly arcuate manner in cross section and the wall webs of the press channel meet a respective tooth tip of a tooth of the wall of the compression ring.

In the exemplary embodiment according to FIG. 18, the compression ring 25 has, between teeth 29 that form in each case two protrusions, a depression in the form of a space 25.1 having a wall region 25.2 which is formed in a curved manner. The teeth 29 having the respective tooth tips 31 also belong to this wall region 25.2 or space 25.1. The wall region 25.2 is clearly inwardly curved, i.e. oriented toward the rotation axis, in a tooth gap between two adjacent teeth 29, wherein the wall region 25.2 is bounded in each case laterally by the teeth 29 with the tooth tips 31.

The passage through the connecting plane VE (FIG. 5) through the rotation axis D of the two press drums 10.1, 10.2 is illustrated in each case by Vo in FIGS. 18 to 23. There, the tooth tip 31 of the tooth 29 of the wall region 25.2 of the space 25.1 at least approximately meets the tooth tip 32.1 of the wall web 32, such that these together form a kind of closing device in the direction of rotation UR of the press drums 10.1 and 10.2 in the high-compaction region, specifically at the wall web 32 which bounds the press channel 27 toward the front in the direction of rotation UR. The wall web 32 located upstream of the press channel 27 of the receiving groove 24 in the direction of rotation is clearly not yet in the contact region of the tooth tip 32.1, located there, of the adjacent tooth 29 of the compression ring 25.

Figure 19:
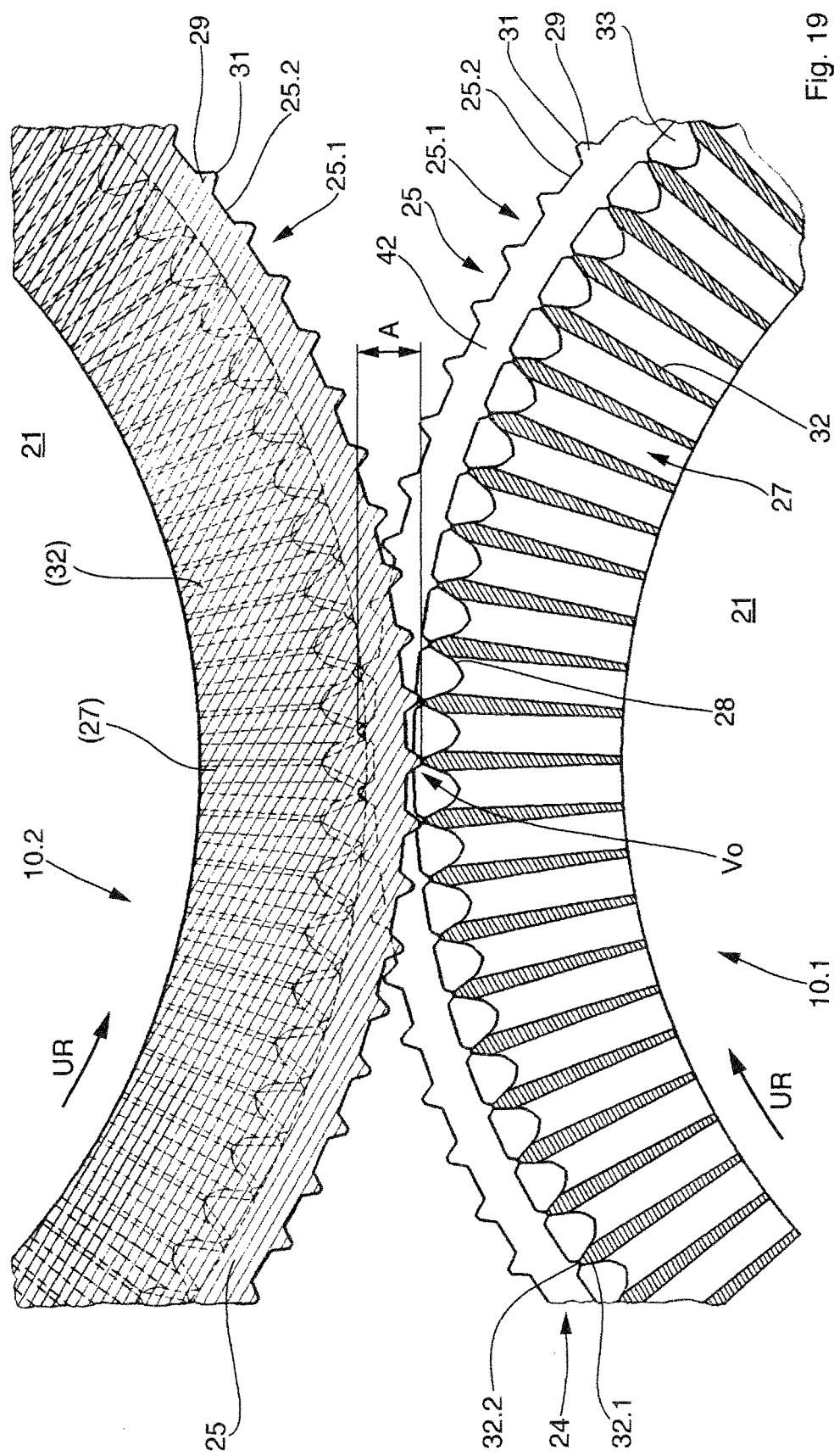
FIG. 19 shows an illustration analogous to FIG. 18 with a wall region that is configured in a rectilinear manner between two teeth of the compression ring.

In FIG. 18, the wall region 25.2 of the space 25.1 of the compression ring 25 is configured in an inwardly curved manner, whereas in the exemplary embodiment according to FIG. 19, between two teeth 29, the wall region 25.2 of the space 25.1 of the compression ring 25 is configured in a rectilinear manner.

Figure 20:
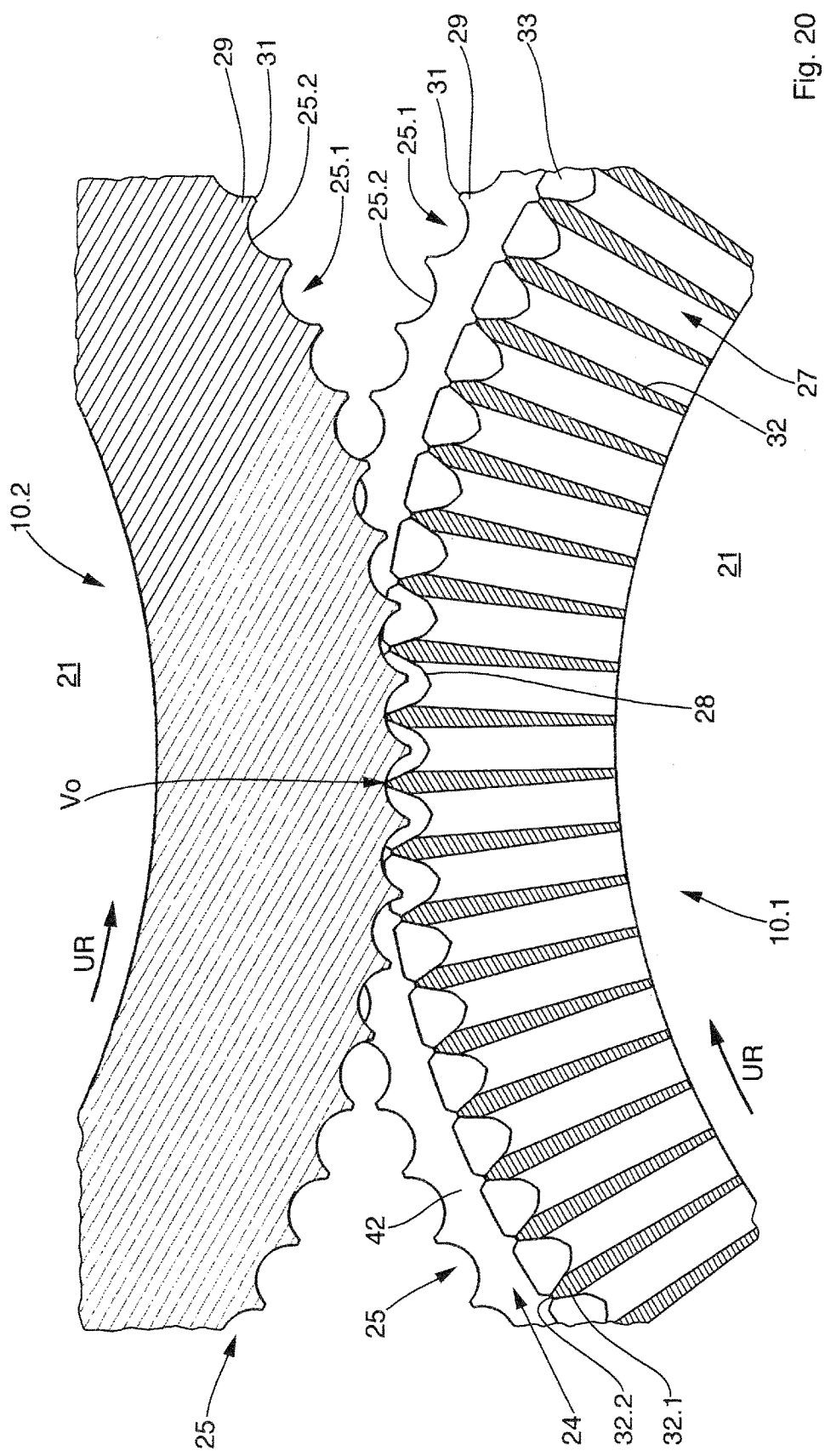
FIG. 20 shows an illustration analogous to FIGS. 18 and 19 of an exemplary embodiment of a compaction region of the compression ring, at which a wall web is oriented more or less centrally toward the curved wall region between two teeth, and the compression ring has a tooth which points more or less centrally in a spike-like manner toward the press channel.
Figure 21:
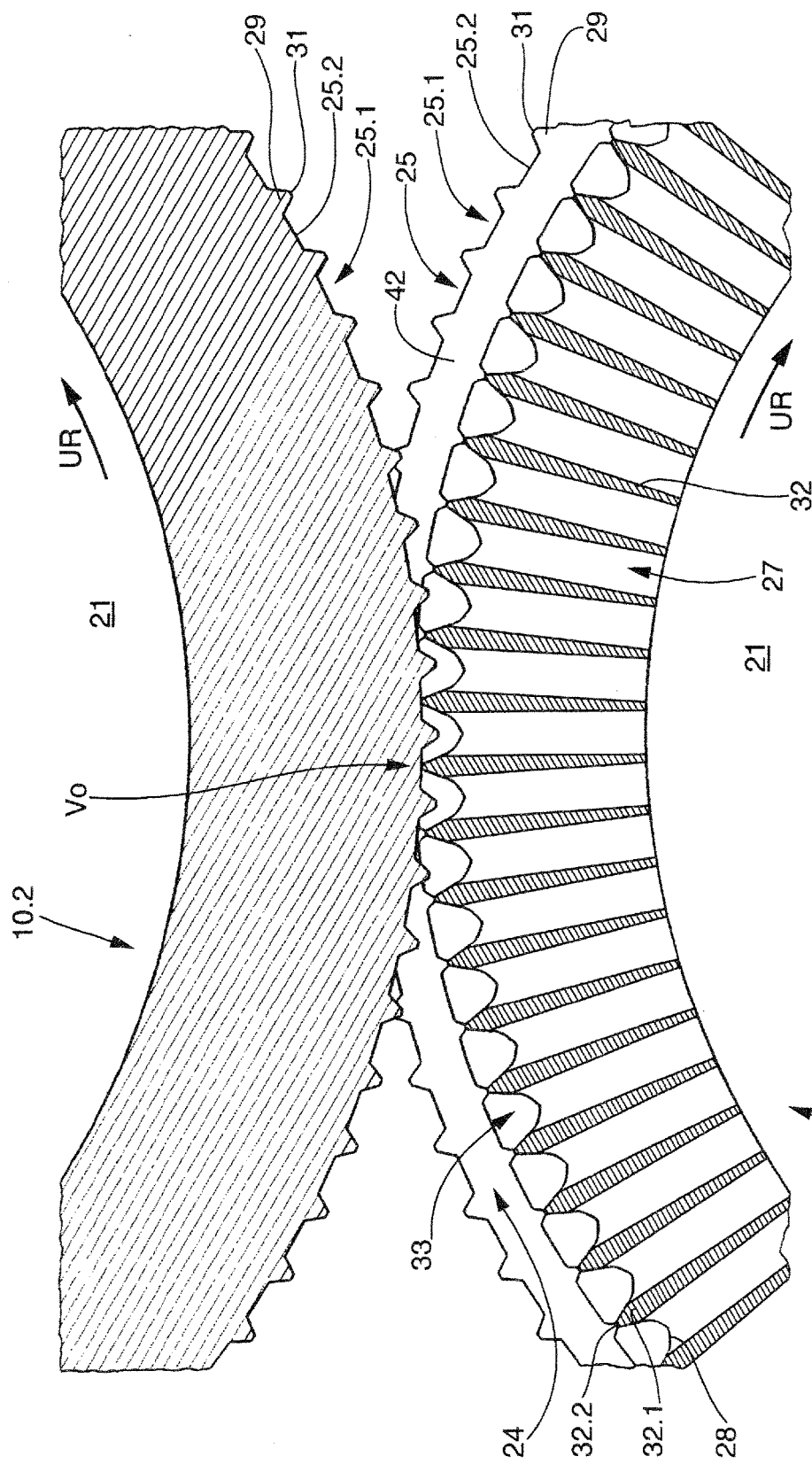
FIG. 21 shows an illustration analogous to FIG. 20 with a wall region that is configured in a rectilinear manner between two teeth of the compression ring.

FIGS. 20 and 21 illustrate alternative exemplary embodiments which are designed substantially in an identical manner in fundamental terms, wherein these embodiments show differently designed walls 25.2 of the space 25.1 of the compression ring 25, specifically in FIG. 20 a wall region 25.2 which is configured in an inwardly curved manner, and in FIG. 21 a wall region 25.2 of the space 25.1 of the compression ring 25, which is configured in a rectilinear manner between two teeth 29. In both exemplary embodiments, the arrangements of the receiving groove 24 and of the compression ring 25 are coordinated with one another such that, on passing the connecting plane VE (FIG. 5) between two press drums 10.1 and 10.2, that is to say at Vo in FIG. 20 and FIG. 21, the wall web 32 of the receiving groove 24 is oriented with the tooth tip 32.2 of the tooth 32.1 of the compression ring 25 more or less centrally toward the wall region 25.2 of the space 25.1, such that the tooth 29 of the respective compression ring 25 points centrally toward the press channel 27 in the groove bottom 28 of the respective receiving groove 24. In this case, the respective tooth 29 of the compression ring 25 in question engages in the introduction region 33 between two adjacent wall webs 32 on passing through the connecting plane VE. Furthermore, on passing through the connecting plane VE, one tooth 32.1 of a respective wall web 32 engages in the space 25 between two adjacent teeth 29 of the compression rings 25, specifically to such an extent that the tooth tip 32.2 of the respective wall web 32 is moved at least close to, preferably up to a few tenths of a millimeter away from, the associated wall region 25.2 of the space 25.1 between two adjacent teeth 29 on the outer circumference of the respective compression ring 25. In this way, the spacing between the rotation axes D of the press drums 10.1, 10.2 is smaller in the exemplary embodiments in FIGS. 20 and 21 than in the exemplary embodiments in FIGS. 18 and 19, specifically smaller by more or less half of one tooth 29. In this way, these teeth 29 of the compression rings 25 can also help in subsequent plugging.

FIG. 22 illustrates a further alternative exemplary embodiment which is similar to the exemplary embodiments according to FIGS. 18 and 19, with the difference that, in this exemplary embodiment, the respective compression rings 25 of the press drums 10.1 and 10.2 have been provided with a closely spaced sawtooth profile 44. In this way, on passing through the connecting plane VE of the rotation axes of the press drums 10.1 and 10.2 (FIG. 5), that is to say on passing through Vo, the wall webs 32 are moved toward the outside diameter of the associated compression ring 25 with a minimum distance between the tooth tip 32.2 of the wall web 32 and the outside diameter of the compression ring 25. In FIG. 22, the degree A of the maximum dipping depth or overlap of the compression ring 25 into the associated receiving groove 24 is also shown.

FIG. 23 illustrates the exemplary embodiment according to FIG. 22 once again in a perspective view. It can be seen here how the respective compression rings 25 of one press drum 10.2 or 10.1 dip into the associated receiving grooves 24 of the other press drum 10.1 or 10.2, such that, on passing through the connecting plane VE (FIG. 5), that is to say on passing through the point Vo in FIG. 22, each compression ring 25 of the press drum 10.1 or 10.2 dips to such a depth into the receiving groove 24 of the press drum 10.1 that the compression ring 25 of the press drum 10.2 is laterally bounded on both sides and thus overlapped by two compression rings 25 of the press drum 10.1.

In each of the different designs of the protrusions and of the intermediate depressions on the outer circumference of the compression rings 25, the annular walls 42, 43 that bound each compression ring 25 on both sides are uninterrupted. As a result, narrow sections of the annular walls 42, 43 that are uninterrupted by the depressions or tooth gaps are also located in the regions of the depressions between successive teeth 29 or other protrusions, in particular in the space 25.1 between adjacent teeth 29. As a result of the continuous annular walls 42, 43 on both sides of the compression ring 25, continuous cutting edges are also located externally on the annular walls 42, 43. By way of the teeth 29 having intermediate tooth gaps on the outer circumference of the compression rings 25, the continuous cutting edges are profiled, as seen in the circumferential direction or in the direction of the rotation axis D, specifically in a sawtooth-like manner in the case of compression rings 25 provided with successive teeth 29. In the case of for example arcuate protrusions and depressions, the cutting edges on the outer circumference of the annular walls 42, 43 would have an undulating shape. Regardless of the shape of the cutting edges, the cutting edges of the compression rings 25 of one press drum 10.1 or 10.2 overlap the cutting edges of the compression rings 25 of the other press drum 10.1 or 10.2 in the high-compaction region, specifically also in the regions of the depressions or tooth gaps. As a result, a continuous, uninterrupted overlap of the cutting edges of both press drums 10.1 and 10.2 is ensured in the high-compaction region and also in the region Vo.

LIST OF REFERENCE SIGNS

1 Pelletizing machine
2 Towing vehicle
3 Chassis
4 Wheel
5 Drawbar
6 Bin
6.1 Bin element
6.2 Bin element
7 Grating
9 Press drum pair
10 Pelletizing apparatus
10.1 Press drum
10.2 Press drum
11 Bearing block
12 Pick-up apparatus
12.1 Roll
12.2 Tines
13 Selector
14 Feed screw
14.1 Tines
15 Feeding device
16 Conveyor belt
17 Feed hopper
18 Roller
19 Precompaction region
20 Suction fan
21 Cavity
22 Conveying screw
23 Conveying belt
24 Receiving groove
25 Compression ring
25.1 Space
25.2 Wall region
27 Press channel
28 Groove bottom
29 Tooth
30 Arcuate contour
31 Tooth tip
32 Wall web
32.1 Tooth
32.2 Tooth tip
33 Introduction region
34 Stripper 35 Collecting apparatus
36 Carrier
37 Wall
38 Stone crusher
39 Drum
40 Introduction drum
41 Heating and/or cooling duct
42 Annular wall
43 Annular wall
44 Sawtooth profile
50 Transmission
A Overlap
B Ground
D Rotation axis
F Direction of travel
R Conveying direction
UR Direction of rotation
VE Connecting plane
Vo High-compaction region

What is claimed is:

1. An apparatus for compacting fibrous plant material or stalk material, having a feeding device (15) for feeding the plant material or stalk material to be compacted and having at least one pair of press drums (10.1, 10.2) that are settable into opposite rotational movements, wherein:
 each of the press drums (10.1, 10.2) has a working width and a circumference;
 each of the press drums (10.1, 10.2) has receiving grooves (24) and compression rings (25) that are arranged alternately alongside one another on the circumference along working width;
 the feeding device (15) comprises a drivable conveyor belt (16) which conveys the material to be compacted into the region of a feed hopper (17) between the press drums (10.1, 10.2), and which wraps around one of the two press drums (10.1, 10.2) regionally over an angle of at least 20° in order to form a precompaction region (19) having a width and a length; and
 the width of the precompaction region (19) is at least as large as the working width of the press drums (10.1, 10.2), and the width of the precompaction region (19) is constant along the length of the precompaction region.

2. The apparatus as claimed in claim 1, wherein the working width of each of the press drums (10.1, 10.2) and the width of the precompaction region (19) have the same dimension.

3. The apparatus as claimed in claim 1, wherein the distance of the conveyor belt (16) from both of the press drums (10.1, 10.2) decreases in a conveying direction.

4. The apparatus as claimed in claim 1, wherein the conveyor belt (16) wraps around at least one of the press drums (10.1, 10.2) over an angular range of 30° to 120°.

5. The apparatus as claimed in claim 1, wherein the conveyor belt (16) is configured in an endless manner and is guided on a number of rollers (18), wherein at least one of the rollers (18) is drivable.

6. The apparatus as claimed in claim 5, wherein at least one of the rollers (18) is adjustable with respect to the distance from each of the press drums (10.1, 10.2).

7. The apparatus as claimed in claim 1, wherein a feed screw (14) having a rotation axis oriented parallel to the ground (B) and transversely to a direction of travel (F) of the apparatus is arranged upstream of the feeding device (15) and a pick-up apparatus (12) is arranged in front of the feed screw (14).

8. The apparatus as claimed in claim 7, wherein the conveyor belt (16) of the feeding device (15) is oriented, in the direction of its width, parallel to the rotation axes (D) of the press drums (10.1, 10.2), and an end, located at a front of the apparatus in a feeding direction of the plant material or stalk material to the press drums (10.1, 10.2) from the pick-up apparatus (12), of the feeding device (15) is located upstream of the furthest forward point, as seen in the feeding direction, of one of the press drums (10.1, 10.2) located towards the front of the apparatus.

9. The apparatus as claimed in claim 1, further comprising a suction fan (20).

10. The apparatus as claimed in claim 1, wherein:
 the compression rings (25) of the in each case one of the press drums (10.1, (10.2) engage in the receiving grooves (24) of the other of the press drums (10.1, 10.2) during the opposite rotational movement of the press drums (10.1, 10.2);
 the compression rings comprise a circumferential profile having radially external protrusions;
 the protrusions comprise an outer contour (30), as viewed in the direction of the rotation axes (D) of the press drums (10.1, 10.2), that is adapted to a corresponding contour of the receiving grooves (24); and
 the contours of the mutually opposite press drums (10.1, 10.2) form a profiled contour line in the plane of the rotation axes (D).

11. The apparatus as claimed in claim 10, wherein the two press drums (10.1, 10.2) are formed in an identical manner and have identical dimensions, the receiving grooves (24) have a width and the compression rings (25) have a width, and the widths of the receiving grooves (24) correspond to the widths of the compression rings (25).

12. The apparatus as claimed in claim 10, wherein the circumferential profile is provided on the outer circumference of the compression rings (25) and the circumferential profile has a depression or a space (25.1) between in each case two adjacent protrusions of the compression rings.

13. The apparatus as claimed in claim 10, wherein the compression rings (25) and the receiving grooves (24) of the press drums (10.1, 10.2) are bounded by opposite, lateral annular walls (42, 43), wherein all the annular walls (42, 43) are located in planes that intersect the respective rotation axis (D) of the press drums (10.1, 10.2) in a perpendicular manner, and the planes of all the annular walls (42, 43) extend parallel to one another, wherein distances between respectively opposite annular walls (42, 43) of the compression rings (25) of the one of the press drums (10.1, 10.2) correspond to the distances between respectively opposite annular walls (42, 43) of the compression rings (25) of the other of the press drums (10.1, 10.2).

14. The apparatus as claimed in claim 10, wherein the press drums (10.1, 10.2) have, in the receiving grooves (24), wall webs (32) that are oriented transversely to the directions of rotation (UR) of the press drums (10.1, 10.2), said wall webs (32) being arranged between adjacent press channels (27) that are distributed over the circumference of the press drums (10.1, 10.2), and the receiving grooves (24) each have a groove bottom (28) provided such that each of the press channels (27) connects its respective groove bottom (28) to an internal cavity (21) formed in each of the press drums (10.1, 10.2), and wherein each groove bottom (28) is bounded by walls of the wall webs (32) that are oriented transversely to the direction of rotation (UR) of the press drums (10.1, 10.2).

15. The apparatus as claimed in claim 14, wherein upper ends of the wall webs (32) that are oriented transversely to the direction of rotation (UR) of the press drums (10.1, 10.2) are configured as radially outwardly projecting protrusions or teeth (32.1) having tooth tips (32.2), wherein the protrusions or teeth (32.1), or the tooth tips (32.2) thereof, radially bound the groove bottom (28).

16. The apparatus as claimed in claim 15, wherein, during the opposite rotational movement of the press drums (10.1, 10.2), on passing through (Vo) the connecting plane (VE) containing the two rotation axes (D) of the press drums (10.1, 10.2), all the compression rings (25) of the one of the press drums (10.1, 10.2) engage in the receiving grooves (24), assigned to these compression rings (25), of the other of the press drums (10.1, 10.2), at least as far as the upper end or tooth tip (32.2) of the respective wall web (32), oriented transversely to the direction of rotation (UR) of the press drums (10.1, 10.2), of the associated receiving groove (24) of the other of the press drums (10.1, 10.2), and on passing through (Vo) the connecting plane (VE), containing the two rotation axes (D), of the press drums (10.1, 10.2), each compression ring (25) of the one of the press drums (10.1, 10.2) is bounded on both sides with a degree of overlap (A) in the associated receiving groove (24) of the other of the press drums (10.1, 10.2) by the compression rings (25) adjacent to the receiving groove (24) of the other of the press drums (10.1, 10.2).

17. The apparatus as claimed in claim 13, wherein the compression rings (25) of the press drums (10.1, 10.2) engage alternately in the receiving grooves (24) of the press drums (10.1, 10.2) with such a degree of overlap (A) that, on passing through (Vo) the connecting plane (VE) containing the two rotation axes (D) of the press drums (10.1, 10.2), there is always an overlap between the annular walls (42, 43), bounding the compression rings (25) on both sides, of the one of the press drums (10.1, 10.2) and the annular walls (42, 43) bounding the compression rings (25) of the other of the press drums (10.1, 10.2) on both sides.

18. The apparatus as claimed in claim 15, wherein a highest point in each case of a radially outwardly projecting protrusion of the compression rings (25) is located in each case opposite a highest point of a wall web (32) of the receiving grooves (24), on passing through the connecting plane (VE) between the press drums (10.1, 10.2), only on passing through this connecting plane (VE), and the highest points of the protrusions of the compression rings (25) and of the wall webs (32) of the receiving grooves (24) in each case form in pairs a closing device in that the highest points of the protrusions of the compression rings (25) and the highest points or tooth tips (32.2) of the wall webs (32) are oriented toward one another.

19. The apparatus as claimed in claim 14, wherein a radially external protrusion of the compression rings (25) has its highest point located between adjacent wall webs (32) of the receiving grooves (24) on passing through the connecting plane (VE) and each protrusion of the compression rings (25) dips at least in part into a space (25.1) between adjacent wall webs (32).

20. The apparatus as claimed in claim 10, wherein the outwardly projecting protrusions on the outer circumference of the compression rings (25) are configured as teeth (29), wherein the teeth (29) have tooth tips (31) at their highest points and a space (25.1), or a recessed wall region (25.2), forming a tooth gap is formed between in each case two adjacent teeth.

21. The apparatus as claimed in claim 13, wherein the outwardly projecting protrusions on the outer circumference of the compression rings (25) are configured as teeth (29), wherein the teeth (29) have tooth tips (31) at their highest points and a space (25.1), or a recessed wall region (25.2), forming a tooth gap is formed between in each case two adjacent teeth, wherein outer circumferential edges of the annular walls (43) that form opposite sides of each compression ring (25) are configured as cutting edges, wherein each cutting edge in the circumferential direction of each particular compression ring (25) has a profiled shape in the circumferential direction on account of the teeth (29) that follow one another and the intermediate depressions or spaces (25.1) and, at least on passing through (Vo) the connecting plane (VE), containing the two rotation axes (D), of the press drums (10.1, 10.2), the cutting edges of all the compression rings (25) of the one of the press drums (10.1, 10.2) and the cutting edges of the other of the press drums (10.1, 10.2), and in this case the cutting edges of the compression rings (25) of the one of the press drums (10.1, 10.2), are located in the receiving grooves (24), corresponding to these compression rings (25), of the other of the press drums (24).

22. The apparatus as claimed in claim 3, wherein the distance of the conveyor belt (16) from both of the press drums (10.1, 10.2) decreases continuously in the conveying direction.

23. The apparatus as claimed in claim 1, further comprising a moistening apparatus.

\* \* \* \* \*